| (12) | United States Patent<br>Knopow et al. | (10) Patent No.: US 10,575,608 B2<br>(45) Date of Patent: *Mar. 3, 2020 |
|---|---|---|

(54) SINGLE-POINT SUPPORTIVE MONOCOQUE AMBULATION AID

(71) Applicant: Motivo, Inc., New Berlin, WI (US)

(72) Inventors: Jeremy Frank Knopow, Burlington, WI (US); Jennifer Ruth Harris, Milwaukee, WI (US)

(73) Assignee: Motivo, Inc., New Berlin, WI (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/649,868

(22) Filed: Jul. 14, 2017

(65) Prior Publication Data

US 2018/0000210 A1 Jan. 4, 2018

Related U.S. Application Data

(63) Continuation of application No. 14/600,721, filed on Jan. 20, 2015, now Pat. No. 9,706,818.

(Continued)

(51) Int. Cl.
*A45B 9/02* (2006.01)
*A61H 3/02* (2006.01)
(Continued)

(52) U.S. Cl.
CPC .................. *A45B 9/02* (2013.01); *A45B 9/00* (2013.01); *A45B 9/04* (2013.01); *A61H 3/02* (2013.01);
(Continued)

(58) Field of Classification Search
CPC .... A45B 9/00; A45B 9/02; A45B 9/04; A45B 2009/007; A61H 3/02
(Continued)

(56) References Cited

U.S. PATENT DOCUMENTS

| 724,382 A | 3/1903 | Conn |
| 929,524 A | 7/1909 | Weaver |

(Continued)

FOREIGN PATENT DOCUMENTS

| CH | 708381 A2 * | 1/2015 |
| DE | 4310167 A1 | 10/1994 |

(Continued)

OTHER PUBLICATIONS

International Searching Authority, "Search Report", issued in connection with PCT patent application No. PCT/US2015/012061, dated Apr. 30, 2015, 3 pages.

(Continued)

*Primary Examiner* — Robert Canfield

(74) *Attorney, Agent, or Firm* — Hanley, Flight and Zimmerman, LLC

(57) ABSTRACT

Example ambulation aid apparatus and associated methods of manufacture are disclosed and described herein. An example single-point supportive ambulation aid is formed as an integral part. The integral part of the example ambulation aid is formed to integrate: a body portion formed to support a user; a graspable area integrated with the body portion and providing an area to be gripped by a user; and a foot portion integrated with the body portion and providing a single point of contact with a walking surface to facilitate user movement and support in conjunction with the body portion and graspable area through the integral part.

18 Claims, 14 Drawing Sheets

Related U.S. Application Data

(60) Provisional application No. 61/929,779, filed on Jan. 21, 2014.

(51) Int. Cl.
| | |
|---|---|
| *A45B 9/04* | (2006.01) |
| *B29C 51/10* | (2006.01) |
| *A45B 9/00* | (2006.01) |
| *B29C 48/08* | (2019.01) |
| *B29C 48/00* | (2019.01) |
| *B29C 49/06* | (2006.01) |
| *B29C 49/04* | (2006.01) |
| *B29C 49/08* | (2006.01) |
| *B29C 51/26* | (2006.01) |

(52) U.S. Cl.
CPC .... *B29C 51/105* (2013.01); *A61H 2201/0192* (2013.01); *B29C 48/0017* (2019.02); *B29C 48/08* (2019.02); *B29C 49/04* (2013.01); *B29C 49/06* (2013.01); *B29C 49/08* (2013.01); *B29C 51/268* (2013.01); *B29C 2049/044* (2013.01); *B29C 2049/047* (2013.01)

(58) Field of Classification Search
USPC .................................................. 135/65, 68
See application file for complete search history.

(56) References Cited

U.S. PATENT DOCUMENTS

| | | | | |
|---|---|---|---|---|
| 1,157,314 | A | * | 10/1915 | Compte et al. .......... A61H 3/02 135/68 |
| 1,358,643 | A | * | 11/1920 | Lamming ................. A61H 3/02 135/69 |
| 1,522,427 | A | | 1/1925 | Farruggio |
| 1,565,582 | A | | 12/1925 | Moore |
| 2,123,311 | A | | 7/1938 | Muller-Roggli |
| 2,568,654 | A | * | 9/1951 | Neptune ................... A61H 3/02 135/68 |
| 2,580,888 | A | * | 1/1952 | Burkett .................... A61H 3/02 135/66 |
| 2,736,330 | A | | 2/1956 | Wood |
| 2,741,255 | A | | 4/1956 | Neptune |
| 2,960,095 | A | | 11/1960 | Smith, Jr. |
| 3,174,494 | A | | 3/1965 | Maguire, Jr. |
| 3,265,401 | A | | 8/1966 | Spier |
| 3,289,685 | A | | 12/1966 | Parker |
| 3,436,090 | A | | 4/1969 | Lange et al. |
| 3,868,122 | A | | 2/1975 | Negi |
| 4,782,845 | A | | 11/1988 | Chou |
| 4,809,725 | A | | 3/1989 | Champigny |
| 4,932,090 | A | | 6/1990 | Johansson |
| 5,024,866 | A | | 6/1991 | Goode |
| 5,193,567 | A | | 3/1993 | Razny, Jr. |
| 5,265,911 | A | | 11/1993 | Goode |
| 5,294,151 | A | | 3/1994 | Goode |
| 5,320,386 | A | | 6/1994 | Harmala et al. |
| 5,331,989 | A | | 7/1994 | Stephens |
| 5,402,811 | A | * | 4/1995 | Weng ....................... A61H 3/02 135/68 |
| 5,445,175 | A | * | 8/1995 | Cho ......................... A61H 3/02 135/68 |
| 5,458,372 | A | | 10/1995 | Goode |
| 5,482,070 | A | | 1/1996 | Kelly |
| 5,495,867 | A | | 3/1996 | Block |
| 5,505,492 | A | | 4/1996 | Nelson et al. |
| 5,605,170 | A | | 2/1997 | Weng |
| 5,752,535 | A | * | 5/1998 | Sanders ................ A61H 3/0288 135/68 |
| D397,644 | S | * | 9/1998 | Douglass ..................... D12/130 |
| 5,875,805 | A | | 3/1999 | Nichols |
| D530,077 | S | | 10/2006 | Smyth et al. |
| 7,222,633 | B1 | | 4/2007 | Werner, III |
| 7,434,592 | B2 | | 10/2008 | Larson et al. |
| 7,610,926 | B2 | | 11/2009 | Adams |
| 7,624,746 | B2 | * | 12/2009 | Blake ...................... A45B 3/04 135/65 |
| 7,647,937 | B2 | | 1/2010 | Gordon |
| 8,047,216 | B2 | | 11/2011 | Parry |
| 9,089,194 | B2 | | 7/2015 | Tessier |
| 9,271,893 | B2 | * | 3/2016 | Knopow .................. A61H 3/04 |
| 9,706,818 | B2 | | 7/2017 | Knopow et al. |
| 10,064,781 | B2 | * | 9/2018 | Clausen .................. A61H 3/02 |
| 2001/0032662 | A1 | | 10/2001 | Battiston |
| 2003/0070701 | A1 | | 4/2003 | Cato, III |
| 2004/0025918 | A1 | * | 2/2004 | Gin ......................... A61H 3/02 135/68 |
| 2004/0025919 | A1 | * | 2/2004 | Garza, Sr. ............... A61H 3/02 135/68 |
| 2004/0025920 | A1 | * | 2/2004 | Garza, Sr. ............... A61H 3/02 135/68 |
| 2004/0025921 | A1 | * | 2/2004 | Garza, Sr. ............... A61H 3/02 135/68 |
| 2004/0025923 | A1 | * | 2/2004 | Garza, Sr. ............... A61H 3/02 135/68 |
| 2004/0025925 | A1 | * | 2/2004 | Gin ......................... A61H 3/02 135/68 |
| 2004/0025926 | A1 | | 2/2004 | Gin et al. |
| 2004/0107981 | A1 | | 6/2004 | Smith |
| 2004/0107982 | A1 | | 6/2004 | Morris |
| 2005/0076941 | A1 | | 4/2005 | Larson et al. |
| 2006/0011229 | A1 | | 1/2006 | Tseng |
| 2006/0142100 | A1 | | 6/2006 | Pearson |
| 2006/0249095 | A1 | | 11/2006 | Godges et al. |
| 2007/0256718 | A1 | | 11/2007 | Diaz |
| 2008/0223424 | A1 | | 9/2008 | Hollier |
| 2008/0283104 | A1 | * | 11/2008 | Weng ....................... A61H 3/02 135/72 |
| 2009/0266392 | A1 | | 10/2009 | Campbell et al. |
| 2010/0006128 | A1 | | 1/2010 | Lamoureux |
| 2010/0071739 | A1 | | 3/2010 | Cho |
| 2010/0154849 | A1 | | 6/2010 | Schulz et al. |
| 2011/0061699 | A1 | | 3/2011 | Parry |
| 2011/0073144 | A1 | | 3/2011 | Goldberg et al. |
| 2011/0094551 | A1 | | 4/2011 | Dalury |
| 2011/0108075 | A1 | | 5/2011 | Weber |
| 2012/0031447 | A1 | | 2/2012 | Lai |
| 2012/0255589 | A1 | | 10/2012 | Larson et al. |
| 2012/0318313 | A1 | | 12/2012 | Dickerson, II |
| 2013/0000687 | A1 | | 1/2013 | Shaw |
| 2013/0199587 | A1 | | 8/2013 | Reydel et al. |
| 2013/0298953 | A1 | | 11/2013 | Amladi |
| 2013/0319489 | A1 | | 12/2013 | Dalury |
| 2013/0327367 | A1 | | 12/2013 | Lindsay, Jr. et al. |
| 2014/0031176 | A1 | | 1/2014 | Knopow et al. |
| 2014/0166061 | A1 | | 6/2014 | Larson et al. |
| 2014/0290708 | A1 | | 10/2014 | Crowley et al. |
| 2015/0000718 | A1 | | 1/2015 | Dickerson, II |
| 2015/0007862 | A1 | | 1/2015 | Dickerson, II |

FOREIGN PATENT DOCUMENTS

| | | |
|---|---|---|
| JP | 2010537686 A | 12/2010 |
| WO | 2009030906 A1 | 3/2009 |

OTHER PUBLICATIONS

International Searching Authority, "Written Opinion", issued in connection with PCT patent application No. PCT/US2015/012061, dated Apr. 30, 2015, 6 pages.

International Searching Authority, "International Preliminary Report on Patentability", issued in connection with PCT patent application No. PCT/US2015/012061, dated Jul. 26, 2016, 7 pages.

United States Patent and Trademark Office, "Notice of Allowance", issued in connection with U.S. Appl. No. 14/600,721, dated Mar. 14, 2017, 13 pages.

United States Patent and Trademark Office, "Final Office action", issued in connection with U.S. Appl. No. 14/600,721, dated Nov. 23, 2016, 13 pages.

(56) References Cited

OTHER PUBLICATIONS

United States Patent and Trademark Office, "Non-Final Office action", issued in connection with U.S. Appl. No. 14/600,721, dated May 13, 2016, 13 pages.

United States Patent and Trademark Office, "Advisory action", issued in connection with U.S. Appl. No. 14/600,721, dated Apr. 22, 2016, 7 pages.

United States Patent and Trademark Office, "Final Office action", issued in connection with U.S. Appl. No. 14/600,721, dated Feb. 4, 2016, 8 pages.

United States Patent and Trademark Office, "Non-Final Office action", issued in connection with U.S. Appl. No. 14/600,721, dated Aug. 20, 2015, 27 pages.

\* cited by examiner

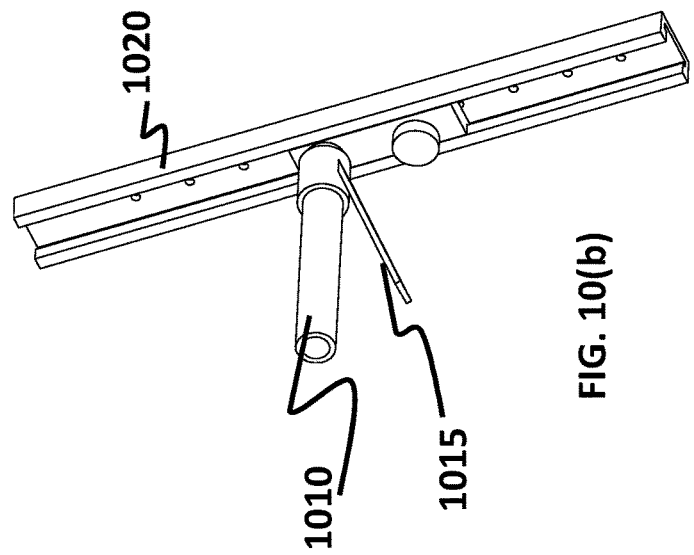
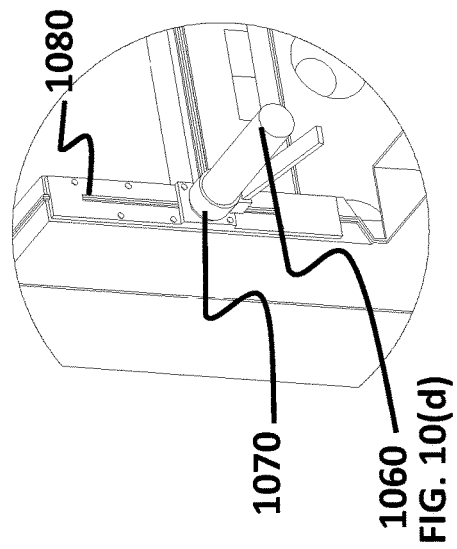
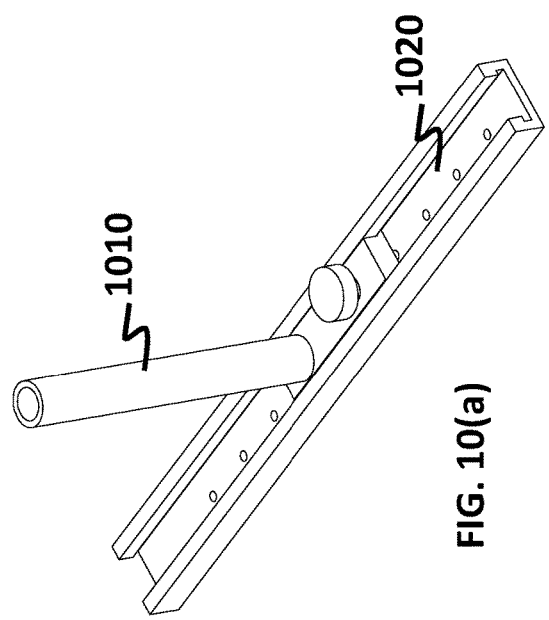
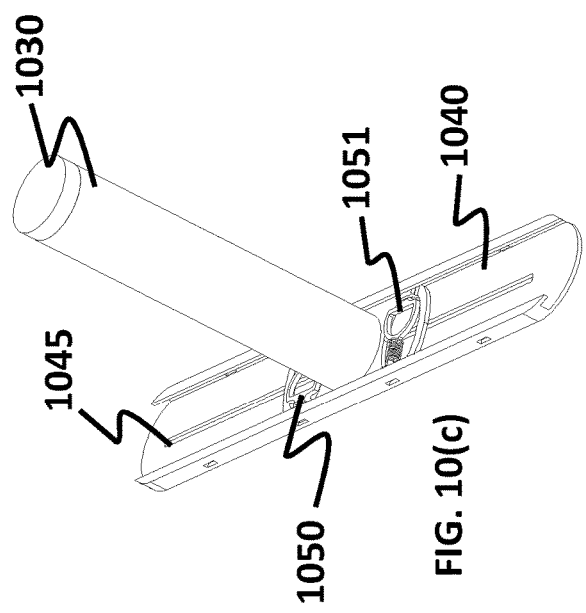

SINGLE-POINT SUPPORTIVE MONOCOQUE AMBULATION AID

CROSS-REFERENCE TO RELATED APPLICATIONS

The present application claims the benefit of priority to U.S. Non-Provisional application Ser. No. 14/600,721, filed on Jan. 20, 2015, entitled "SINGLE-POINT SUPPORTIVE MONOCOQUE AMBULATION AID", which claims the benefit of priority to U.S. Provisional Patent Application No. 61/929,779, filed on Jan. 21, 2014, entitled "MONOCOQUE AMBULATION AID", each of which is hereby incorporated by reference in its entirety for all purposes.

FIELD

The present field of invention relates to ambulation aids, and more specifically to an ambulation aid formed in monocoque, semi-monocoque, unibody, or other integral construction.

BACKGROUND

A range of ambulation aids have been developed over the many years since these devices were first introduced. These devices are used to assist people in the act of walking or standing by providing weight bearing and/or balance assistance. Historically, the basic construction method has changed little, with the vast majority being constructed of extruded metal tubing. A smaller percentage of devices have been constructed of assembled polyvinyl chloride (PVC) plumbing pipe, hydroformed metal, or occasionally injection molded polymer parts.

In either case, multiple pieces (e.g., multiple tubes) must be assembled to create a frame on which one or more supports can be provided to aid in user mobility. Such tubular frame-based assemblies are complex to manufacture and assemble and suffer from multiple joiners and other contact points. Additionally, the tubular frame creates an undesirable aesthetic. Further, an excessive amount of time and multiple processes may be required in assembly.

Current construction techniques only offer a limited range of engineering and design flexibility. This is due to the nature of the materials used, as well their method of manufacturing and construction. Designs based on tubular materials are limited by factors such as the availability of stock materials, bend radii of the tubes, how the tubes are joined at intersections, weight of the tubes, strength of the tubes, the overall shape and form of the cylindrical materials, etc. Hydroformed metal construction allows for more design flexibility than tubular materials, but the nature of the hydroforming process and the materials used are expensive and can quickly place the ambulation aid out of the price range of most users. Injection molded polymer construction can offer yet more design flexibility than hydroformed metal, but the geometry required to make the parts strong enough for use result in an overly heavy part. In addition to the weight disadvantage, all of the structural ribbing required to make an injection molded solid polymer part strong enough for use results in a part that is generally unattractive on at least one side, while all of the cracks and crevices also make it difficult to clean.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings and photos accompanying and forming a part of this specification, wherein like reference numerals designate the same elements in the several views, and in which:

FIGS. 10a-d illustrate example handle configurations facilitating movement of a handle moveably affixed to a body of an ambulation aid.

DETAILED DESCRIPTION OF CERTAIN EMBODIMENTS

Overview and Brief Description

Figure 1:
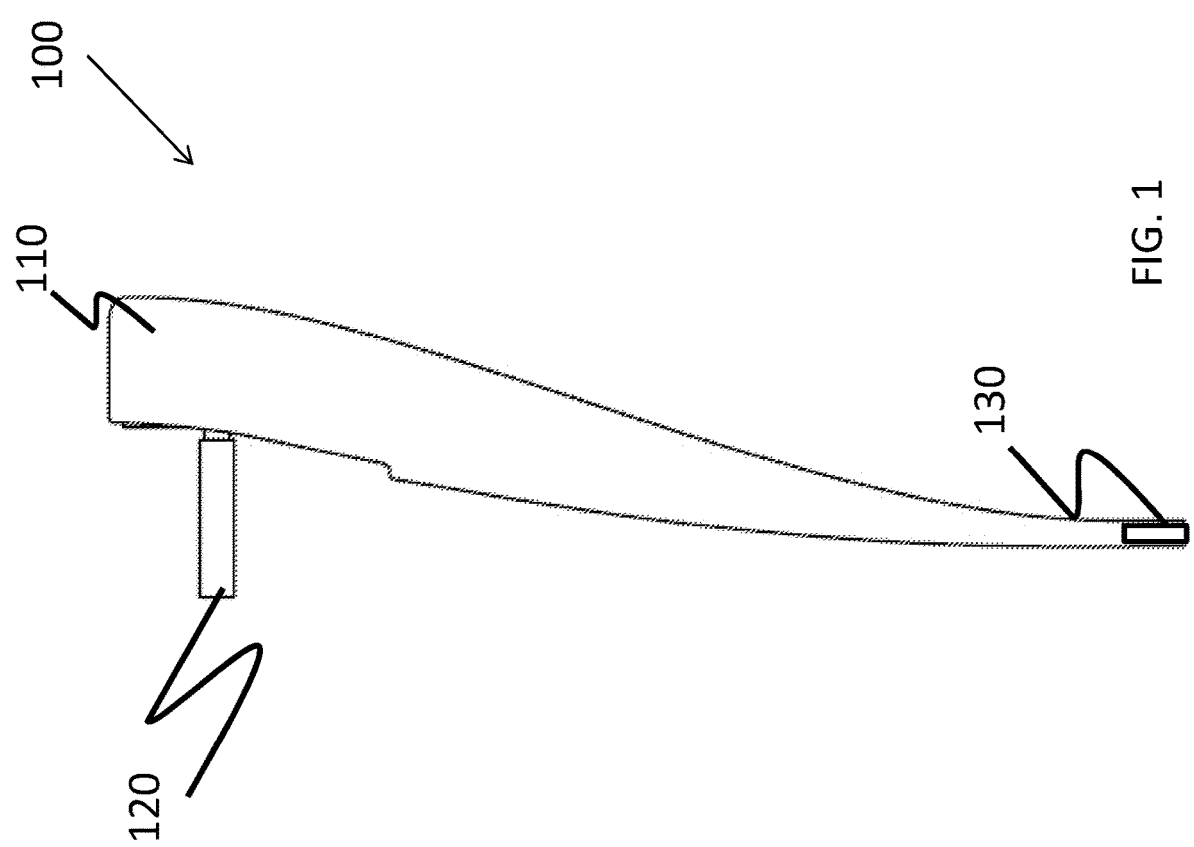
FIGS. 1-5 illustrate views of an example cane-type ambulation aid.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "connected," "including," and "comprising" and variations thereof in the description and the claims is meant to encompass the items listed thereafter and equivalents thereof as well as additional items and equivalents thereof.

Certain examples described and disclosed herein relate to ambulation aids, and more specifically to ambulation aids formed in unibody, unitary, monocoque, and/or semi-monocoque construction for simplified manufacture, durable construction, and user support, as well as more pleasing aesthetics and increased design options. For example, an ambulation aid can be constructed to be primarily hollow and made of a molded polymer material, allowing for a lightweight, yet strong, customizable, and economically viable solution. The ambulation aid can include a cane- or walking stick-type ambulation aid, a crutch-type ambulation aid, etc. The inventive structure also allows for integrated accommodations such as hooks, holders, latches, compartments, height adjustment, and/or the like to be integrated into and/or otherwise attached to the structure.

In certain examples, an assistive cane, crutch, or other mobility aid can help redistribute weight from a user's lower leg. The aid can improve stability by increasing a base of support for the user's leg. The aid can also provide tactile information to the user about the ground or other walking surface to help improve balance of the user. Canes are generally lighter than crutches. However, since a cane transfers a user weight load through the user's unsupported side, the cane is unable to offload equal loads from both legs, for example. In contrast to a cane or crutch, a walker held in front of the user allowing the user to lean on it is more stable due to a greater surface area contacting the ground, floor, etc., but walkers are larger and less wieldy than canes or crutches.

In certain examples, an ambulation aid apparatus is formed to unify a plurality of structural and/or ornamental features into a single integral part. For example, a body of the example ambulation aid apparatus may serve as a protective shell with integrated support frame while also providing a cosmetic exterior for the ambulation aid. Thus, the ambulation aid body provides structural strength and support while also providing a cosmetic exterior and/or interior for the apparatus in a single integral part (e.g., using monocoque construction). The body of the example ambulation aid may also provide integrated mounting and/or attachment point(s) to attach one or more components/subassemblies to the body.

Certain examples provide a unibody or monocoque design to lend simplicity, stability, and improved support to the ambulation aid. A unibody or monocoque design is a structural approach that supports loads through the ambulation aid's shell or skin, which provides a combined body and frame in a single structure (rather than a tubular frame constructed from a plurality of separate but connected tubes and including additional attachments). In certain examples, a monocoque or unibody ambulation aid provides a structural skin or shell designed to bear weight from a user relying on the ambulation aid for movement, stability, and/or other support.

In monocoque construction, for example, a skin or surface is the supporting structure for the ambulation aid. All or most of the load on the aid is taken by the surface or skin. Semi-monocoque construction is a hybrid structure in which a surface, skin, or shell is reinforced with rings, ribs, or frames to help carry the stress of a load, for example. In unibody construction, for example, a body is combined with a frame to provide supporting structure for the ambulation aid. In body on frame construction, for example, a skin is wrapped around a structural frame to provide supporting structure for the ambulation aid. In certain examples, one or more of monocoque, unibody, and body-on-frame construction can be combined to create a hybrid ambulatory aid apparatus.

In certain examples, an integral body of an example ambulation aid can be formed from one or more slabs or sheets of material. For example, the integral body can be formed from one or more sheets of a polymer material. Surface(s) of the integral body can be molded, machined, and/or otherwise formed via a thermoforming, extrusion, and/or other process, for example. As used herein, the terms sheet, slab, and core may be used interchangeably.

In certain examples, an external contour of an integral body of an example ambulation aid can embody an outward and interior physical appearance of the ambulation aid. That is, the integral body can include various ornamental features that improve an aesthetic appearance of the ambulation aid, for example.

Certain examples provide an apparatus including an ambulation aid body formed as an integral part, the integral part formed in monocoque construction to provide support for mobility of a user through the integral part, the integral part providing a plurality of grippable areas to facilitate user movement and support through the integral part.

In some examples, the ambulation aid body is to be formed as an integral part via a thermoforming process. In some examples, the ambulation aid body includes a reinforced, hollow integral part. In some examples, the ambulation aid body is to be formed from a polymer material.

In some examples, the plurality of grippable areas include one or more of a handle, an opening, a top of the ambulation aid body, a side of the ambulation aid body. In some examples, the handle is at least one of movably affixed to and incorporated into the ambulation aid body. In some examples, the handle is to be movable with respect to the ambulation aid body to adjust a height of the ambulation aid body with respect to the user.

Certain examples provide a method of forming a monocoque ambulation aid. The example method includes forming, from a supply of moldable material, an ambulation aid body as an integral part in monocoque construction, the ambulation aid body formed in monocoque construction to provide support for mobility of a user through the integral part, the integral part providing a plurality of grippable areas to facilitate user movement and support through the integral part. In some examples, the method further includes attaching one or more subassemblies to the formed ambulation aid body. In some examples, the ambulation aid body includes one or more connectors to enable the ambulation aid body to be folded.

In some examples, forming includes forming, from a supply of moldable material using a thermoforming process, an ambulation aid body. In some examples, the thermoforming process includes a twin sheet thermoforming process. In some examples, forming includes forming, from a supply of moldable material using a blow molding process, an ambulation aid body. In some examples, forming further includes reinforcing the ambulation aid body to produce a reinforced, hollow integral part. In some examples, the supply of moldable material includes a polymer-based material.

In some examples, the plurality of grippable areas include one or more of a handle, an opening, a top of the ambulation aid body, a side of the ambulation aid body. In some examples, the handle is at least one of movably affixed to and incorporated into the ambulation aid body. In some examples, the handle is to be movable with respect to the ambulation aid body to adjust a height of the ambulation aid body with respect to the user.

Certain examples provide an ambulation aid apparatus. The example ambulation aid apparatus includes a primary panel formed in monocoque construction to provide support for and assist in mobility of a user through the skin of the monocoque primary panel, the primary panel formed to interrelate with one or more subassemblies to provide an integrated monocoque part to assist in providing support for and improved mobility of the user through the integrated monocoque part. In some examples, the primary panel is to be formed via a thermoforming process. In some examples, the primary panel includes a reinforced, hollow monocoque part.

In some examples, the one or more subassemblies include one or more grippable areas including one or more of a handle and an opening with respect to the ambulation aid apparatus. In some examples, the one or more subassemblies include at least one of a tread, a skid, a metallic cleat, etc., affixed to the ambulation aid apparatus to facilitate movement of the ambulation aid apparatus by the user.

For example, a cane-type ambulation aid can be formed by which one or more portions of the cane (e.g., handle, collar, shaft/body, foot/ferrule, etc.) are formed as one via monocoque, unibody, and/or similar construction. Such construction simplifies, unifies, and strengthens the cane and reduces its cost and likelihood of failure. Similarly, one or more portions of a crutch can be formed as one via monocoque, unibody, and/or similar construction to simplify, unify, and strengthen the crutch for a user and reduce cost while enhancing durability and reliability, for example.

Certain examples provide a single-point supportive ambulation aid formed as an integral part. The integral part of the example ambulation aid is formed to integrate: a body portion formed to support a user; a graspable area integrated with the body portion and providing an area to be gripped by a user; and a foot portion integrated with the body portion and providing a single point of contact with a walking surface to facilitate user movement and support in conjunction with the body portion and graspable area through the integral part.

A method of forming a single-point supportive ambulation aid as an integral part. The example method includes providing a supply of moldable material; and forming, from the supply of moldable material, the ambulation aid as an integral part. In the example method, the integral part formed to integrate: a body portion formed to support a user; a graspable area integrated with the body portion and providing an area to be gripped by a user; and a foot portion integrated with the body portion and providing a single point of contact with a walking surface to facilitate user movement and support in conjunction with the body portion and graspable area through the integral part.

Example Ambulation Aids

FIGS. 1-5 illustrate views of an example cane-type ambulation aid. As illustrated in the examples of FIGS. 1-5, while formed from a monocoque, unibody, and/or other similar design, the example cane-style ambulation aid 100 provides an adaptable, adjustable, easy to use and maintain assistant for a user who needs or desires an aid for walking, standing, etc.

As shown in the example of FIG. 1, an example cane-style ambulation aid 100 includes a body portion 110 (e.g., a monocoque, unibody, body-on-frame, and/or other construction body), a graspable area 120, and a foot portion 130. For example, the cane-style ambulation aid 100 shown in FIG. 1 includes a single body portion 110 to which a foot 130 (e.g., a rubber pad, plastic pad, etc.) is attached. A handle and/or other graspable portion 120 protrudes from the body 110 in the example apparatus 100. FIG. 1 illustrates a side or profile view of the example apparatus 100.

The body 110 of the example ambulation aid 100 shown in FIG. 1 can be manufactured from a molded material such as a polymer-based material formed in unibody or monocoque construction (e.g., hollow, foam-filled, etc.) to provide a lightweight, yet strong, and customizable support for a user, such as an elderly user, rehabbing patient, disabled user, obese user, etc.

The body 110 can be formed by a variety of manufacturing processes including a twin sheet thermoforming process. In certain examples, the body 110 can include and/or be formed from material including transparent, translucent, antimicrobial, bullet resistant, and/or other material. The body 110 can be provided with one or more customizable finishes (e.g., laminate, co-extruded laminate, paint, plating, texturing, applied graphics, embedded color/finish in base material, etc.), for example.

In certain examples, the body 110 serves as an enclosure, frame, support, and cosmetic exterior for the ambulation aid 100 to provide a rigid structure to the aid 100. In some examples, the body 110 may include openings, compartments, attachment points, interlocking configurations, etc., to facilitate incorporation and/or other attachment of accessories, components, and/or other subassemblies with and/or into the body 110. Depending upon size and configuration, one or more accessories/components/subassemblies can be formed as part of the body 110, separate from and attached to the body 110, and/or provided by a third party and accommodated by forming openings and/or other attachment points in the body 110, for example.

The body 110 and associated components are formed from one or more selected materials. Material selected to form the body 110 and/or other component(s) may be selected based on one or more factors including strength (e.g., tensile strength), density (e.g., lightweight), strength to weight ratio, Young's modulus, weather resistance, antimicrobial properties, cleaning ability, bullet resistance, formability, finishing, recyclability, tooling costs, design flexibility, manufacturing cost, reproducibility, etc. Material selection may also depend on and/or be influenced by aesthetics including color, transparency, translucency, durometer, surface finish, etc.

In certain examples, the body 110 is formed as a single integral part. For example, the body 110 is formed as a single, complete unit. By being integrally formed, the body 110 is structurally stronger than conventional multi-part constructed frames (e.g., traditional canes that include parts that are fastened together). Further, unlike conventional devices that include seams between component parts, the example body 110 has a substantially seamless appearance. Construction of a mobility aid from substantially fewer parts provides benefits for a stable feel and manufacturing efficiency (e.g., faster throughput due to less assembly, fewer hand touches, etc.), for example. Fewer connected parts and less play in their connections results in less rattling and a more secure/stable body 110, for example. Additionally, by forming the body 110 as a single integral part, weather resistance, water resistance, recyclability, etc., is improved.

In certain examples, the body 110 provides support to a user while lending strength and stability to the user via the body 110 as well as to connected components such as handle 120, foot 130, etc. Further, the body 110 provides an aesthetically pleasing look by forming part of an ornamental appearance of the ambulation aid 100.

The graspable area 120 provides support to a user to grip and hold onto the aid 100. In certain examples, rather than protruding handles 120, one or more openings in the body panel 110 and/or other grips on or in the body panel 110 can be provided. In certain examples, the foot portion 130 can include a skid, ski, tread, metallic cleat, etc., instead of or in addition to a foot post, pad, peg, etc., to facilitate stability and movement of the aid 100 while supporting the user.

In some examples, the graspable area 120 can be implemented as a post or pole graspable by a user for support and/or mobility. The graspable area 120 can be molded from plastic, die-cast metal, extruded plastic and/or metal, etc. The graspable area 120 can be integrated into the body 110 design. In certain examples, different size mobility aids can be produced with a fixed and/or movable handle.

Figure 2:
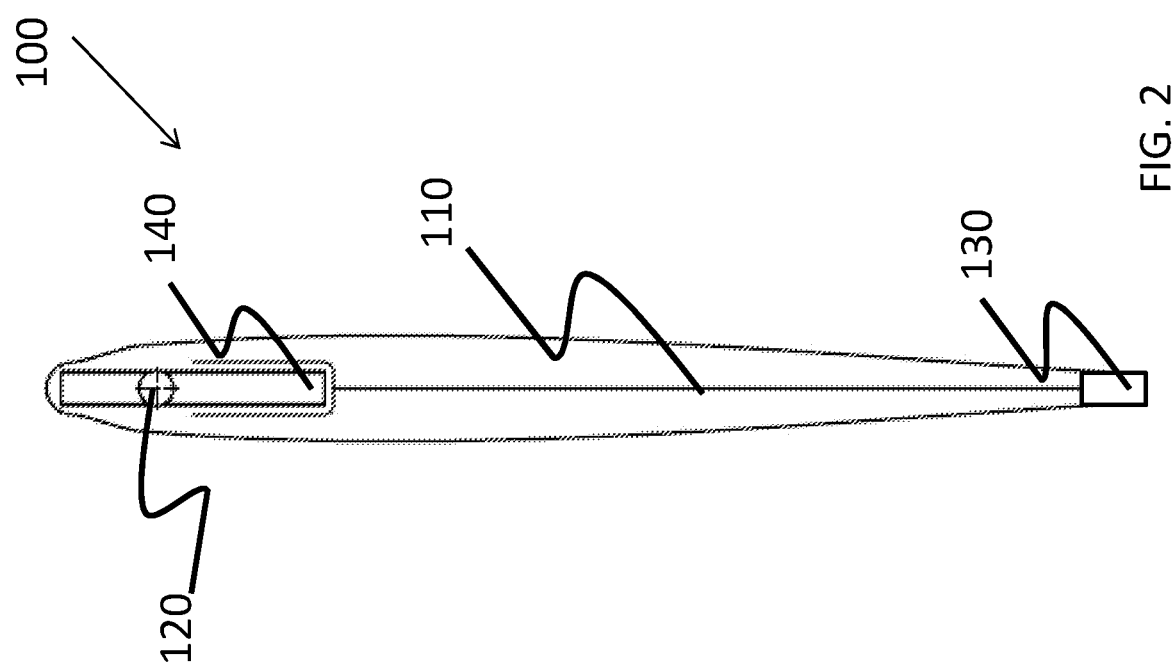
Figure 5:
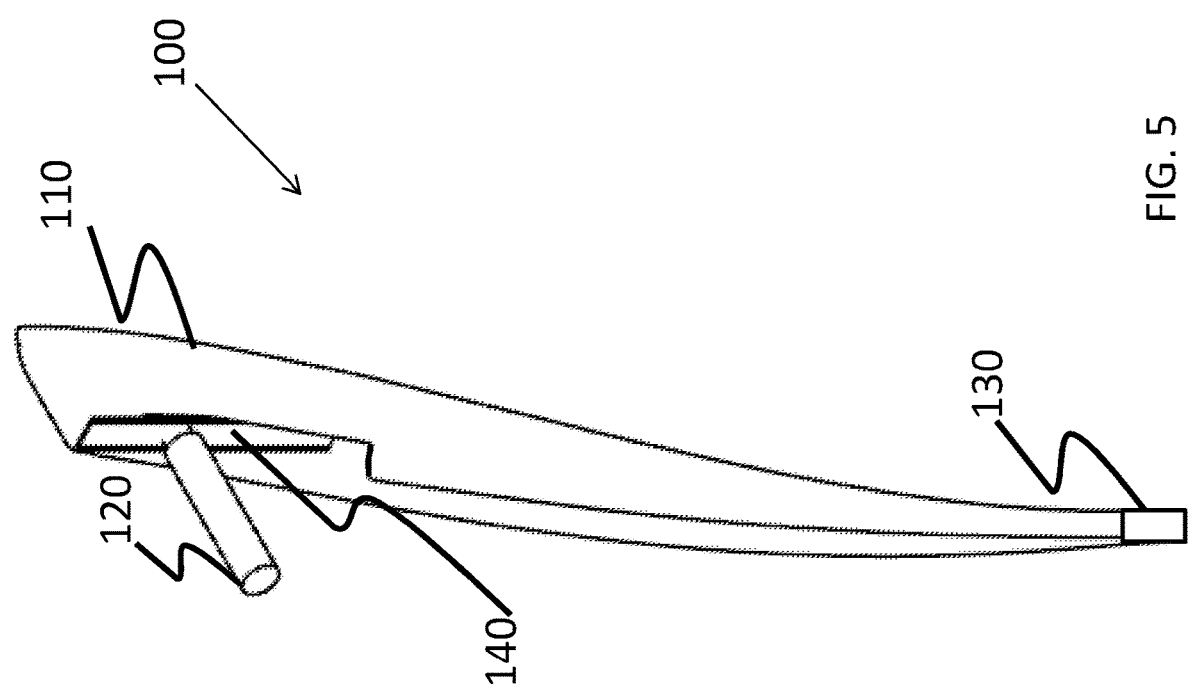

In some examples, the graspable area 120 (e.g., a handle) is positioned in a T-slot track (e.g., mounted on or including a T-slot nut or other connector that slides in a T-slot track) such that the graspable portion 120 slides up and down in the T-slot track (also illustrated, for example, in FIGS. 2 and 5). The track can be designed into the main body 110 geometry, a separate channel (e.g., metal, plastic, other polymer, etc.) can be inserted into the molding process to be integrated with the plastic body 110 (insert molding), and/or the track can be supplied as a separate part, for example.

In some examples, a cam lock, set screw, snap, button, spring loaded plunger, ball, or other fastener locks and/or otherwise holds the graspable area 120 in place at a point along the track. Using the graspable area 120, a user can adjust a usable height of the ambulation aid 100. Rather than adjusting leg/foot height, a desired height adjustment can be achieved by manipulation of the graspable area 120 along the track.

In some examples, the graspable area 120 and sliding geometry can be combined into one part, which then slides along a track or is fastened at discrete locations (e.g., threaded inserts that can be unscrewed and screwed) along the body 110. The combined part can be molded plastic, die cast metal, welded assembly (e.g., metal or plastic), bonded assembly, threaded assembly, etc. In certain examples, rather than sliding along a track, the graspable area 120 can be fastened at one or more discrete locations along the body 110 via interlocking geometry, threaded fasteners, Velcro™, knob clamp, threaded holes, miter track stops, etc. As another example, handle height can be adjusted via telescoping members protruding from the main body 110 that can be locked into different heights.

Additionally, handles employed in example ambulation aids may include a variety of grips to facilitate user comfort, durability, and control. In some examples, a separate grip can be supplied to cover the graspable area 120 to provide comfort and increased graspability. In some examples, the graspable area 120 can be implemented as a two-shot injection molded part in which a grip area is a different (e.g., softer, lower durometer, etc.) material than the rest of the part (e.g., a first shot of hard plastic and a second shot of rubber).

FIG. 2 illustrates a rear view of the example apparatus 100. As in FIG. 1, the example ambulation aid 100 includes a body portion 110, a graspable area 120, and a foot portion 130. As illustrated in the example of FIG. 2, the graspable area 120 (e.g., a handle) can be situated in a track or other receptacle 140. In certain examples, the receptacle 140 allows the graspable portion 120 to move. For example, the graspable area 120 can be implemented as a handle that is movable within a track 140. The handle can be vertically movable, for example. In other examples, the handle and/or other graspable portion 120 can be horizontally and/or otherwise movable within a track, along a guide, and/or other receptacle 140.

In certain examples, the foot portion 130 can be movable with respect to the body portion 110 to adjust a height of the body portion 110 with respect to the ground, floor, or other surface serving as a reference plane upon which the aid 100 is placed for use. Thus, for example, the graspable portion 120 and/or the foot portion 130 can be adjusted to a) adjust a height of the aid and/or b) adjust a position of the graspable portion 120 in the body 110 (and thereby with respect to a user).

Figure 3:
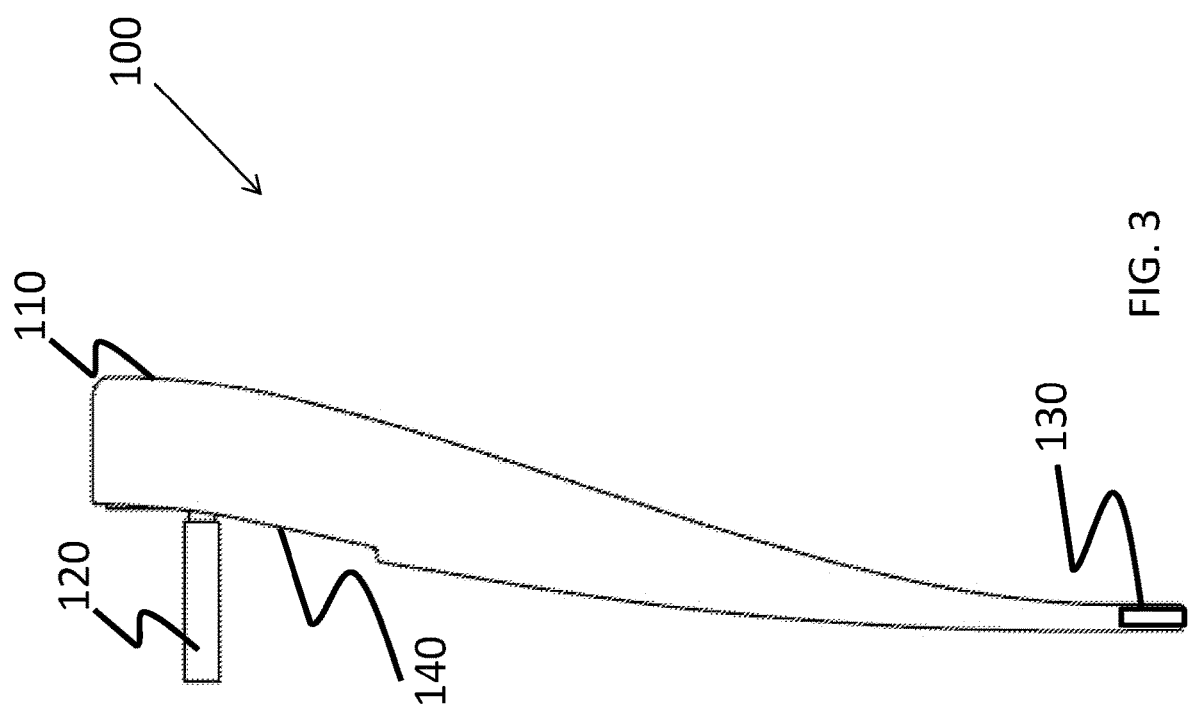

FIG. 3 depicts the example ambulation aid 100 viewed from a side. As in FIGS. 1-2, the example cane-type ambulation aid 100 of FIG. 3 includes a body portion 110, a graspable area 120, and a foot portion 130. The graspable area 120 can reside in and/or otherwise be attached to a receptacle 140 allowing a position (e.g., a height) of the graspable area 120 to be adjusted with respect to the body portion 110 (and thereby also with respect to a height of a user of the aid 100). Thus, the example cane-type ambulation aid 100 shown in FIG. 3 can be used by a variety of people of a variety of sizes comfortably and easily using the adjustable handle and/or other graspable area 120.

Figure 4:
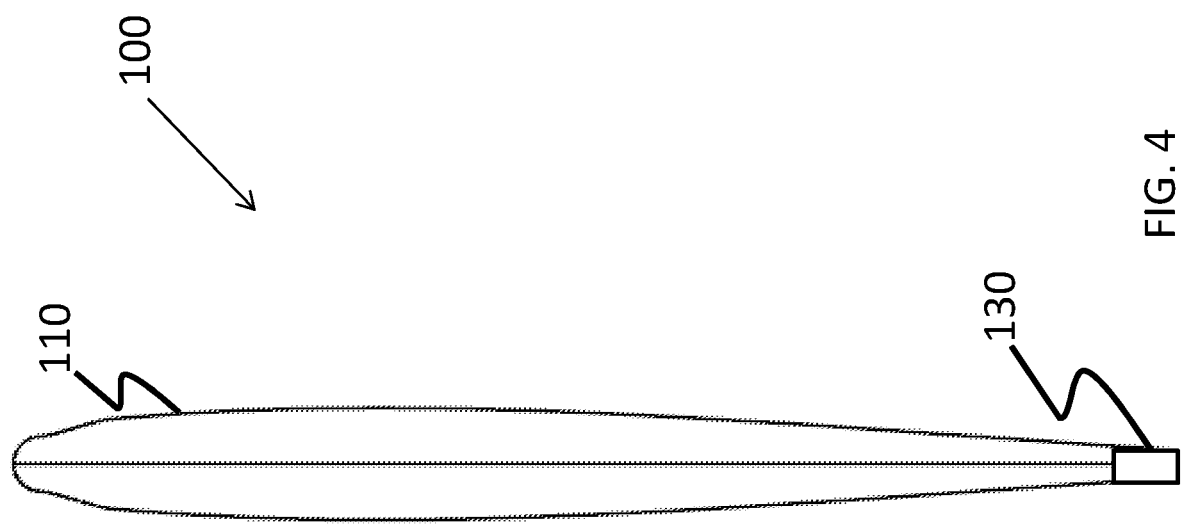

Additionally, FIG. 4 shows a front view of the example ambulation aid 100. As shown in the example, the body portion 110 and foot portion 130 of the cane- or staff-type ambulation aid are visible when viewed from a front view.

FIG. 5 shows an example perspective view of the cane-type ambulation aid 100. As illustrated in the example of FIG. 5, a handle-type graspable area 120 is moveable along with and/or with respect to a channel and/or other receptacle 140 housed in a body portion 110 of the aid 100. The graspable area 120 is movable within and/or with respect to the receptacle 140 to adjust a graspable height of the aid 100 with respect to a user, for example. A foot portion 130 helps provide traction, stabilization, etc., during use of the example aid 100 by a user, for example.

FIGS. 6-9 illustrate views of an example crutch-type ambulation aid 200. As illustrated in the examples of FIGS. 6-9, while formed from a monocoque, unibody, and/or other similar design, the example crutch-style ambulation aid 200 provides an adaptable, adjustable, easy to use and maintain assistant for a user who needs or desires an aid for walking, standing, etc.

Figure 6:
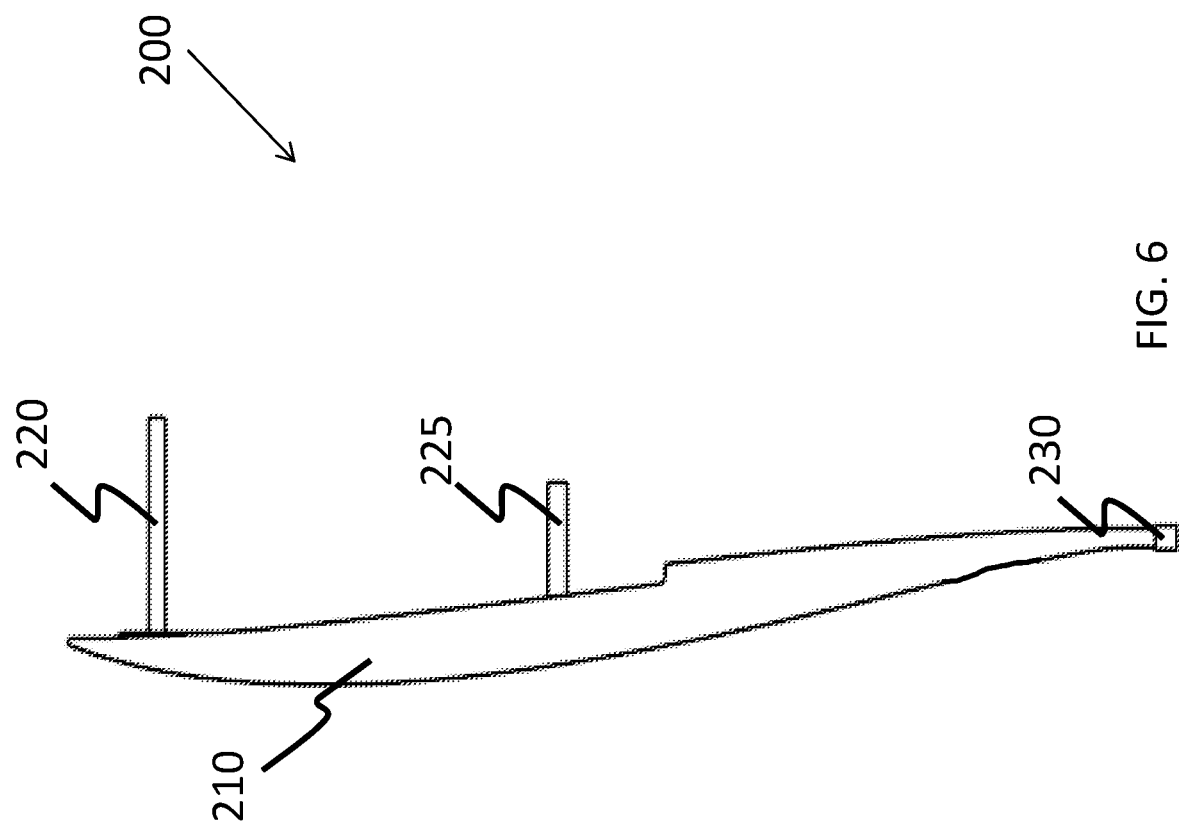
FIGS. 6-9 illustrate views of an example crutch-type ambulation aid.

As shown in the example of FIG. 6, the example crutch-style ambulation aid 200 includes a body portion 210 (e.g., a monocoque, unibody, body-on-frame, and/or other construction body), a plurality of graspable areas 220, 225, and a foot portion 230. For example, the crutch-style ambulation aid 200 shown in FIG. 6 includes a single body portion 210 to which a foot 230 (e.g., a rubber pad, plastic pad, etc.) is attached. A handle and/or other graspable portion 220 protrudes from the body 210 in the example apparatus 200. FIG. 6 illustrates a side or profile view of the example apparatus 200.

The body 210 of the example ambulation aid 200 shown in FIG. 6 can be manufactured from a molded material such as a polymer-based material formed in unibody or monocoque construction (e.g., hollow, foam-filled, etc.) to provide a lightweight, yet strong, and customizable support for a user, such as an elderly user, rehabbing patient, disabled user, obese user, etc.

The body 210 can be formed by a variety of manufacturing processes including a twin sheet thermoforming process. In certain examples, the body 210 can include and/or be formed from material including transparent, translucent, antimicrobial, bullet resistant, and/or other material. The body 210 can be provided with one or more customizable finishes (e.g., laminate, co-extruded laminate, paint, plating, texturing, applied graphics, embedded color/finish in base material, etc.), for example.

In certain examples, the body 210 serves as an enclosure, frame, support, and cosmetic exterior for the ambulation aid 200 to provide a rigid structure to the aid 200. In some examples, the body 210 may include openings, compartments, attachment points, interlocking configurations, etc., to facilitate incorporation and/or other attachment of accessories, components, and/or other subassemblies with and/or into the body 210. Depending upon size and configuration, one or more accessories/components/subassemblies can be formed as part of the body 210, separate from and attached to the body 210, and/or provided by a third party and accommodated by forming openings and/or other attachment points in the body 210, for example.

The body 210 and associated components are formed from one or more selected materials. Material selected to form the body 210 and/or other component(s) may be selected based on one or more factors including strength (e.g., tensile strength), density (e.g., lightweight), strength to weight ratio, Young's modulus, weather resistance, antimicrobial properties, cleaning ability, bullet resistance, formability, finishing, recyclability, tooling costs, design flexibility, manufacturing cost, reproducibility, etc. Material selection may also depend on and/or be influenced by aesthetics including color, transparency, translucency, durometer, surface finish, etc.

In certain examples, the body 210 is formed as a single integral part. For example, the body 210 is formed as a single, complete unit. By being integrally formed, the body 210 is structurally stronger than conventional multi-part constructed frames (e.g., traditional canes that include parts that are fastened together). Further, unlike conventional devices that include seams between component parts, the example body 210 has a substantially seamless appearance. Construction of a mobility aid from substantially fewer parts provides benefits for a stable feel and manufacturing efficiency (e.g., faster throughput due to less assembly, fewer hand touches, etc.), for example. Fewer connected parts and less play in their connections results in less rattling and a more secure/stable body 210, for example. Additionally, by forming the body 210 as a single integral part, weather resistance, water resistance, recyclability, etc., is improved.

In certain examples, the body 210 provides support to a user while lending strength and stability to the user via the body 210 as well as to connected components such as handle 220, 225, foot 230, etc. Further, the body 210 provides an aesthetically pleasing look by forming part of an ornamental appearance of the ambulation aid 200.

The graspable areas 220, 225 provide support to a user to grip and hold onto the aid 200. In certain examples, rather than protruding handles 220, 225, one or more openings in the body panel 210 and/or other grips on or in the body panel 210 can be provided. In certain examples, the foot portion 230 can include a skid, ski, tread, etc., instead of or in addition to a foot post, pad, peg, metallic cleat, etc., to facilitate stability and movement of the aid 200 while supporting the user.

In some examples, the graspable areas 220, 225 can be implemented as a post or pole graspable by a user for support and/or mobility. The graspable areas 220, 225 can be molded from plastic, die-cast metal, extruded plastic and/or metal, etc. The graspable areas 220, 225 can be integrated into the body 210 design. In certain examples, different size mobility aids can be produced with a fixed and/or movable handle.

Figure 7:
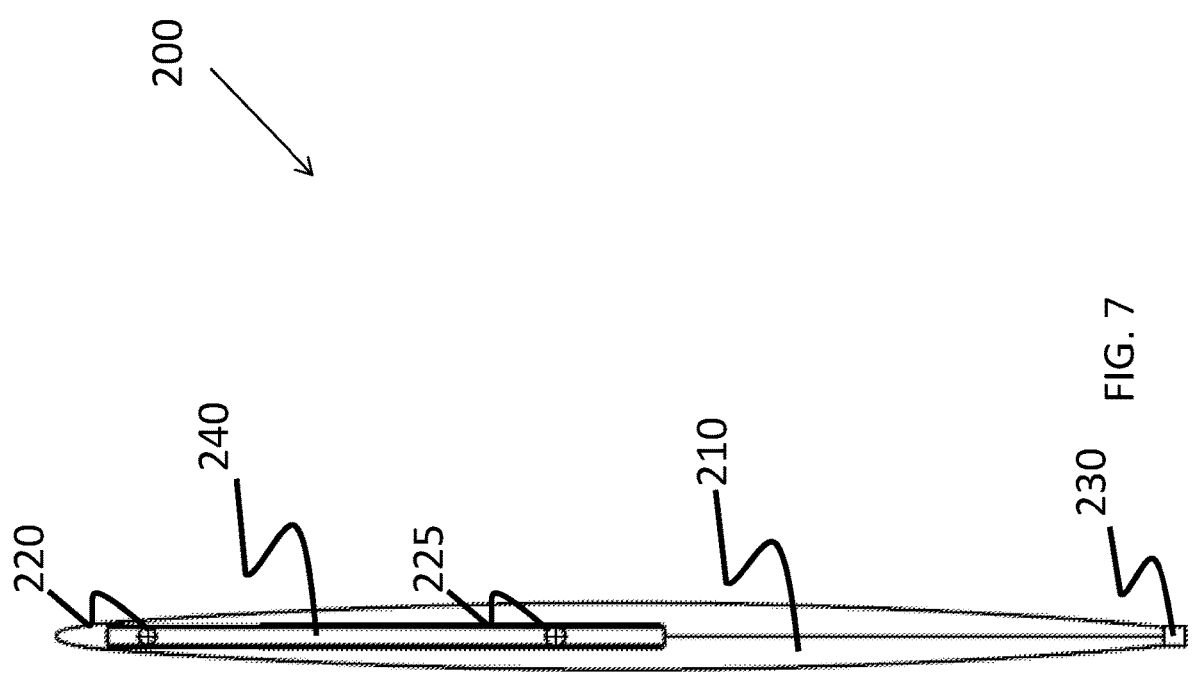
Figure 8:
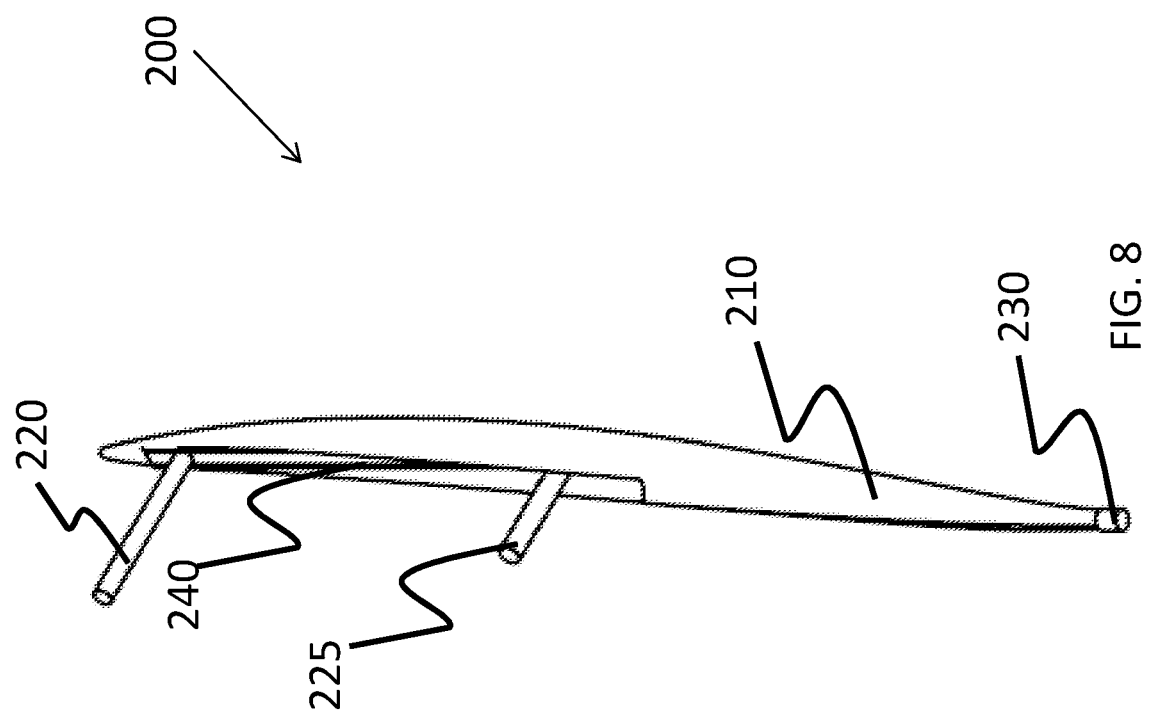
Figure 9:
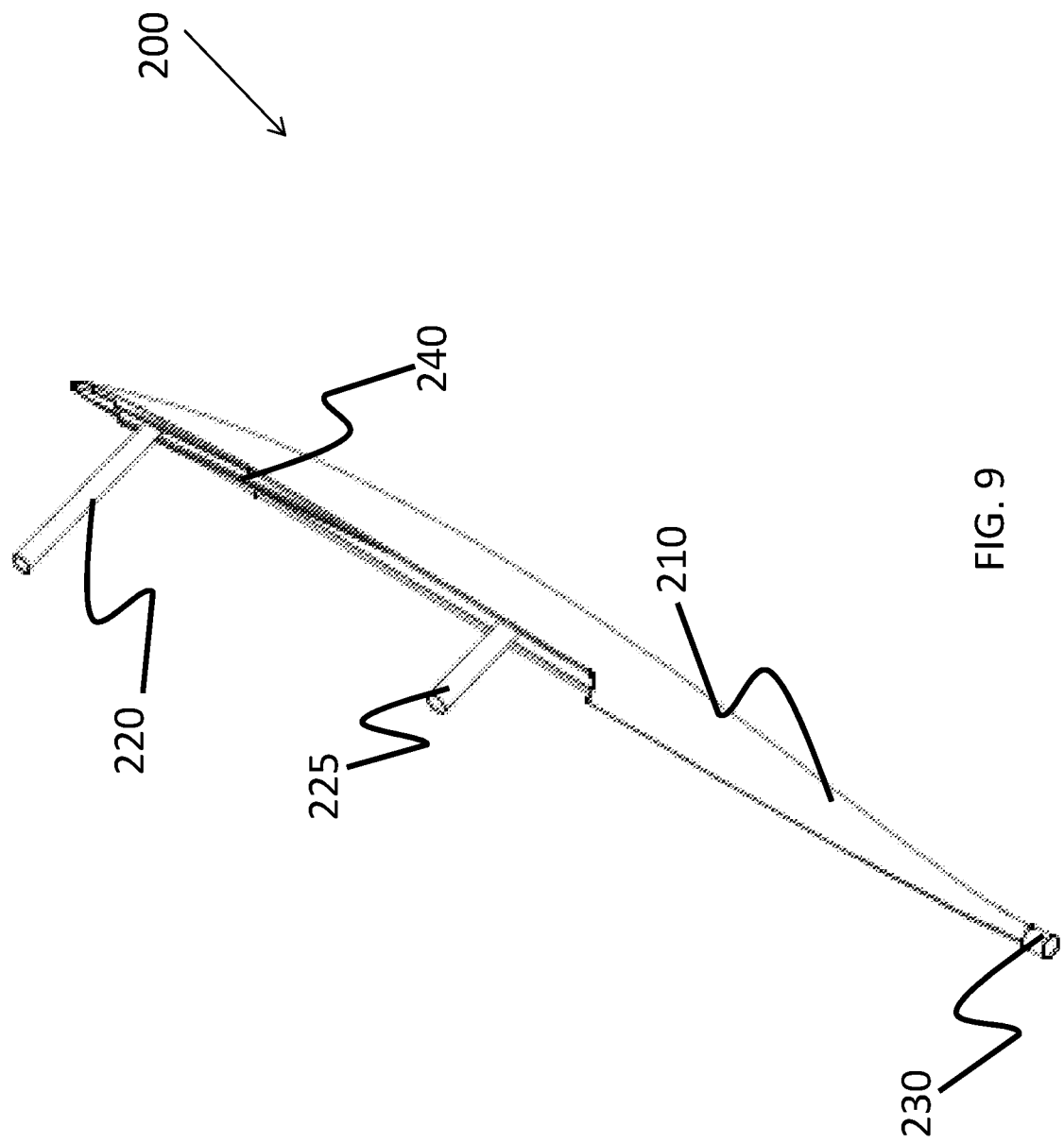

In some examples, one or more of the graspable areas 220, 225 (e.g., a handle) are positioned in a T-slot track (e.g., mounted on or including a T-slot nut or other connector that slides in a T-slot track) such that the graspable portions 220, 225 slide up and down in the T-slot track (also illustrated, for example, in FIGS. 7-9). The track can be designed into the main body 210 geometry, a separate channel (e.g., metal, plastic, other polymer, etc.) can be inserted into the molding process to be integrated with the plastic body 210 (insert molding), and/or the track can be supplied as a separate part, for example.

In some examples, a cam lock, set screw, snap, button, spring loaded plunger, ball, or other fastener locks and/or otherwise holds the graspable areas 220, 225 in place at a point along the track. Using the graspable areas 220, 225, a user can adjust a usable height of the ambulation aid 200. Rather than adjusting leg/foot height, a desired height adjustment can be achieved by manipulation of the graspable areas 220, 225 along the track.

In some examples, the graspable areas 220, 225 and sliding geometry can be combined into one part, which then slides along a track or is fastened at discrete locations (e.g., threaded inserts that can be unscrewed and screwed) along the body 210. The combined part can be molded plastic, die cast metal, welded assembly (e.g., metal or plastic), bonded assembly, threaded assembly, etc. In certain examples, rather than sliding along a track, the graspable areas 220, 225 can be fastened at one or more discrete locations along the body 210 via interlocking geometry, threaded fasteners, Velcro™, knob clamp, threaded holes, miter track stops, etc. As another example, handle height can be adjusted via telescoping members protruding from the main body 210 that can be locked into different heights.

Additionally, handles employed in example ambulation aids may include a variety of grips to facilitate user comfort, durability, and control. In some examples, separate grips can be supplied to cover the graspable areas 220, 225 to provide comfort and increased graspability. In some examples, each of the graspable areas 220, 225 can be implemented as a two-shot injection molded part in which a grip area is a different (e.g., softer, lower durometer, etc.) material than the rest of the part (e.g., a first shot of hard plastic and a second shot of rubber).

FIG. 7 illustrates a rear view of an example crutch-style ambulation aid 200 including a body portion 210, graspable areas 220, 225, and a foot portion 230. As illustrated in the example of FIG. 7, the graspable areas 220, 225 (e.g., handles) can be situated in a track or other receptacle 240. In certain examples, the receptacle 240 allows the graspable portions 220, 225 to move. For example, one or more of the graspable areas 220, 225 can be implemented as a handle that is movable within a track 240. The handle 220, 225 can be vertically movable, for example. In other examples, the handle and/or other graspable portion(s) 220, 225 can be horizontally and/or otherwise movable within a track, along a guide, and/or other receptacle 240.

In certain examples, the foot portion 230 can be movable with respect to the body portion 210 to adjust a height of the body portion 210 with respect to the ground, floor, or other surface serving as a reference plane upon which the aid 200 is placed for use. Thus, for example, one or more of the graspable portions 220, 225 and/or the foot portion 230 can be adjusted to a) adjust a height of the aid and/or b) adjust a position of the graspable portion(s) 220, 225 in the body 210 (and thereby with respect to a user).

FIG. 8 depicts a rear perspective view of the example ambulation aid 200. As in FIGS. 6-7, the example crutch-type ambulation aid 200 of FIG. 8 includes a body portion 210, a plurality of graspable areas 220, 225, and a foot portion 230. The graspable area(s) 220, 225 can reside in and/or otherwise be attached to a receptacle 240 allowing a position (e.g., a height) of the graspable area(s) 220, 225 to be adjusted with respect to the body portion 210 (and thereby also with respect to a height of a user of the aid 200). Thus, the example crutch-type ambulation aid 200 shown in FIG. 8 can be used by a variety of people of a variety of sizes comfortably and easily using the adjustable handle and/or other graspable area 220, 225.

FIG. 9 shows a further angled view of the example ambulation aid 200. As illustrated in the example of FIG. 9, one or more of a plurality of handle-type graspable areas 220, 225 is moveable along with and/or with respect to a channel and/or other receptacle 240 housed in a body portion 210 of the aid 200. The graspable area(s) 220, 225 are movable within and/or with respect to the receptacle 240 to adjust a graspable height of the aid 200 with respect to a user, for example. A foot portion 230 helps provide traction, stabilization, etc., during use of the example aid 200 by a user, for example.

FIGS. 10a-c illustrate example handle configurations facilitating movement of a handle moveably affixed to a body of an ambulation aid. FIGS. 10a-b illustrate example T-slot configuration for a handle 1010 within a track 1020 including a brake mechanism 1015. FIG. 10c shows an example mechanism to adjust handle height, in which a handle 1030 is held in place along a track 1040 with one or more sprung pins 1050-1051. The handle 1030 can be attached to a shuttle in the track 1040 and/or can be combined with a shuttle into one subassembly (e.g., with or without an associated braking mechanism). Parts of the handle mechanism can be manufactured using plastic and/or other extrusion, stamping, and/or forming of sheet material separately and/or as part of the main body of the ambulation aid, for example. A slot or hole 1045 is provided in the track 1040 to allow for a cable, guide, and/or other element to pass through from one side of the track to another. Concealing a cable, etc., in this way prevents potential snags in use and also adds to the overall cosmetic appeal of the design, for example. FIG. 10d illustrates an example of a handle 1060 attached to a mounting plate 1070 with a slot 1080 to allow for a cable and/or other element to pass between walls of the ambulation aid and remain hidden from view.

In certain examples, the example ambulation aid 100, 200 includes one or more areas on and/or in the body 110, 210 by which to provide a decal, logo, picture, and/or other customization. Thus, a decoration, identification, personalization, etc., can be provided by a manufacturer, seller, and/or user in the customizable display area, for example. The customizable display area may be slightly indented with respect to the rest of the body 110, 210, for example, to accept custom decals (e.g., flowers, golf, commercial logo (e.g., sports teams, colleges, business, etc.), photos, etc.) and/or other graphic to decorate the ambulation aid 100, 200, for example. In certain examples, the body 110, 210 can include one or more windows, voids, and/or other openings to provide access, air flow, accessory fitting, etc. In certain examples, holes generated to facilitate air flow during forming of the body 110, 210 can be incorporated into and/or hidden by an opening or other feature in the body 110, 210.

In certain examples, the ambulation aid 100, 200 can also and/or alternatively include an accessory area or mount provided in the body 110, 210. The accessory area/mount can be used for a light, reflector, decal, logo, speaker, etc. If the accessory is electronic, a battery and/or other power source can be, for example, positioned behind the accessory in the area, otherwise located inside the body 110, 210, and/or attached to the body 110, 210 and/or other attached element, such as a handle track, handle, tray, seat, storage, etc.

In certain examples, different materials can be used in a manufacturing process to provide a range of ambulatory aid products with varying characteristics. Ambulatory aid products can be formed from polymer material, metal, fiberglass, etc. For example, high-density polyethylene (HDPE), acrylonitrile butadiene styrene (ABS), ABS with an acrylic cap, acrylic, thermoplastic olefin (TPO), polypropylene (PP), polycarbonate (PC), polyethylene (PE), polyethylene terephthalate (PET), polyethylene terephthalate glycol-modified (PETG), etc., can be used to form panels and/or accessory parts of an ambulation aid. Further, laminated films and/or other printed graphics, screen printed, pad printed, etched, textured, etc., can provide decorative effects (e.g., carbon fiber, brushed metal, wood grain, logos (e.g., sports team, etc.), photos, etc.) applied, co-extruded, co-cast, etc., to a plastic substrate, such an ABS or TPO substrate, with or without an acrylic over cap layer. In certain examples, the interior and exterior can be different colors and materials, such as having a glossy metallic exterior material and a textured or soft touch, leather-like material on the interior. Acrylic, PC, PP, PET, PEG, RPET, or the like can be used to create a clear part. Using thermoplastics, such as HDPE, TPO, PP, PE, PET, PETG, etc., enables portions of the body to be formed as a living hinge, including an ability to mold the tray and/or the seat as part of the main body using a living hinge configuration, for example. Alternatively, components such as the seat, tray, etc., can be molded separately and attached with a separate hinge, for example.

In certain examples, an ambulation aid is constructed using a polymer material to create a hollow, structurally stable panel or set of panels. Such construction can be accomplished in a single step by manufacturing processes such as, but not limited to, rotational molding, blow molding, injection molding (e.g., with or without a foaming agent), gas assisted injection molding (e.g., with or without a foaming agent), extrusion, or twin sheet thermoforming. Alternatively or additionally, two or more separate parts can be created and later joined together to create a hollow part. The separate parts can be created by manufacturing processes such as, but not limited to, injection molding, thermoforming, extrusion, slumping, etc. These parts can then be joined by processes such as, but not limited to, adhesive bonding, chemical welding, ultrasonic welding, snap/interlocking fit, thermal bonding, etc.

In certain examples, part(s) can also be created by laying or spraying fiberglass type material, carbon fiber, etc. For example, a flat sheet of fiberglass material can be formed into a part and/or ambulation aid structure, for example. Chopped fiberglass can be sprayed over and/or into a mold to form a part. A composite material can be created by spraying and/or laying up fiberglass onto/into another shell material (e.g., formed plastic or other polymer, etc.) for added structural integrity. Additionally, part(s) can be stamped out of metal and welded, brazed, soldered, mechanically fastened, interlocking/snap fit, and/or glued together, for example. In certain examples, lost core (e.g., sand, wax, etc.) casting methods can be used to create a hollow metal part. Die cast part(s) can also be created. In certain examples, inflatable part(s) can be formed.

In certain examples, a filler, such as foam, can be inserted in a hollow shell to provide additional support. In certain examples, a solid form such as solid foam can be formed (e.g., machined) and skinned for appearance and/or structure. A foaming agent can be used with injection molding to create a semi-hollow/hollow part, for example, In certain examples, one or more snap-on type covers can be added over a frame to provide an ambulation aid or component part(s). For example, a panel, wrap, etc., can be snapped or otherwise affixed onto a frame to provide an ambulation aid. Panels can provide support, decoration, etc. In certain examples, panels can be used to create a body-on-frame, unibody, or unitary design, for example.

In certain examples, a cover can be stretched over a frame, instead of or in addition to being snapped on. Alternatively or in addition, a cover can be slipped over a frame. Covers can also attach to each other, inside and outside, versus attaching to a frame.

For example, foam (e.g., light but rigid foam) can be injected into a hollow polymer body to help support the hollow body. Inserted foam can add to strength of the body (e.g., for a bariatric version of an ambulation aid to support 500 lbs). Foam insertion can be done as part of twin sheet thermoforming or after the part has been thermoformed. In some examples, a honeycomb or lattice (e.g., cardboard honeycomb soaked in resin) can be used as an insert into a hollow body to add strength to the hollow part.

Additional strength can also be provided via additional inserted structural elements (e.g., metal, plastic, fiberglass, etc.), internal and/or external to the body, for example. In certain examples, ribbing and/or other features aside from kiss offs/near kiss offs can be provided in the design of the monocoque ambulation aid structure to help provide strength and stability.

In certain examples, an ambulation aid includes various opportunities to "kiss off," where two pieces of material (e.g., plastic or other polymer) come together to form the part. For example, a kiss off can include a mating of walls of the aid for additional strength and stability. A "near kiss" represents where the two walls are almost mating but not quite, which alleviates issues with witness marks affecting appearance. Based on ornamental surface lines and functional seams and openings in the body 110, 210 and/or other portion of the aid 100, 200, kiss off points can be minimized or hidden so as not to distract from the aesthetic appearance of the ambulation aid.

In an example, an outside mold and an inside mold are used to form two sheets of plastic, which are then pushed together to create the integral part (e.g., the mobility aid or walker body panel). As opposed to tubular metal or PVC, such molding and forming provides a hollow, structurally sound, and adaptable unibody/integral monocoque part for the mobility aid, while maintaining a lighter weight.

Example Methods of Manufacture

Figure 11:
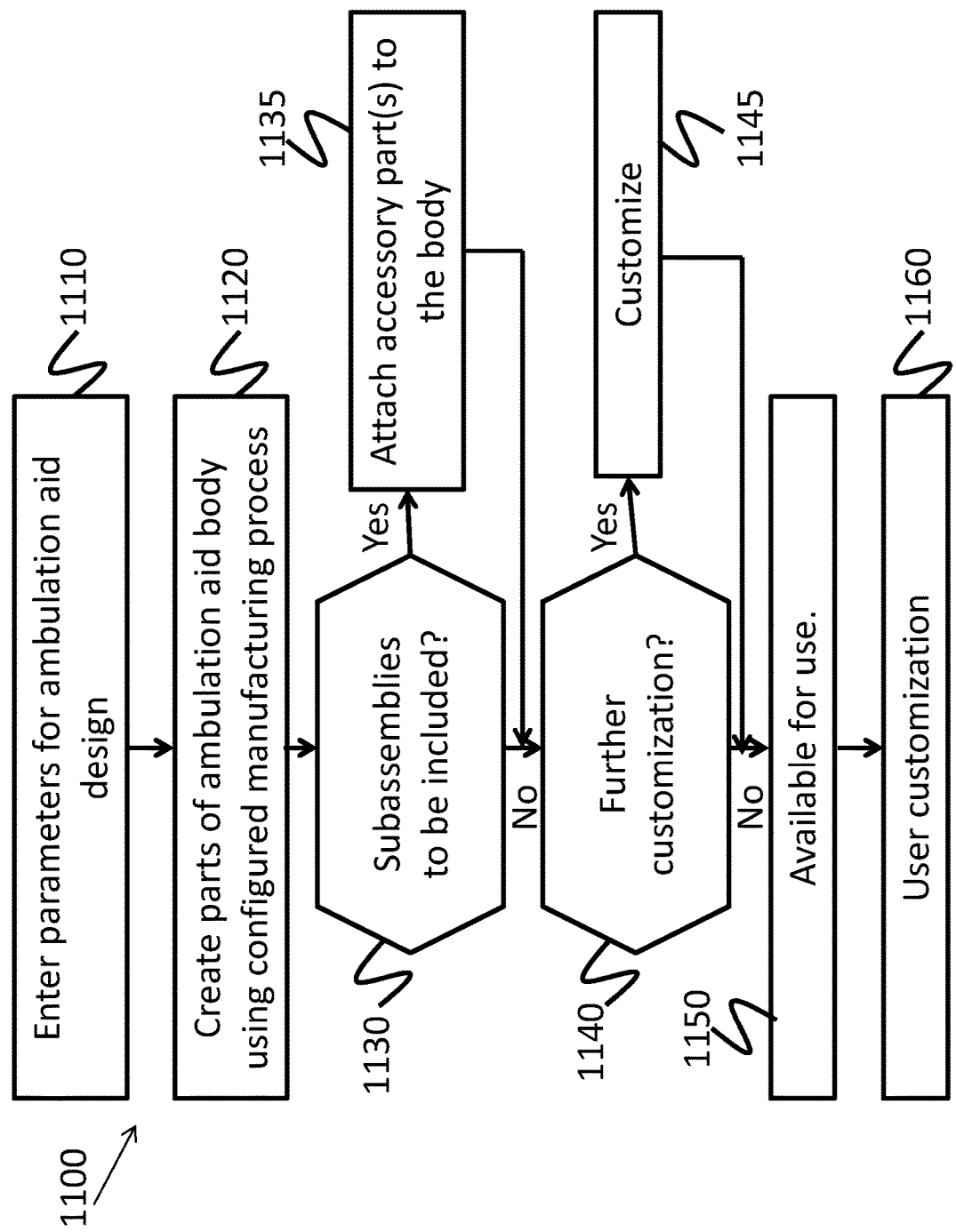
FIG. 11 illustrates a flow diagram of an example method to manufacture an ambulation aid.

FIG. 11 illustrates a flow diagram of an example method 1100 to manufacture an ambulation aid. At block 1110, parameters for design of an ambulation aid are entered. For example, a process can be selected and configured for thermoforming, blow molding, injection molding, slumping, etc. Parameters regarding shape, thickness, spacing, accessory(-ies), color, texture, other customization, etc., can also be specified. Parameters may be used to configure a machine and/or process for manufacture of one or more part(s) of the ambulation aid. Initial input parameters and customization for a particular design can be provided for the manufacturing process.

At block 1120, one or more parts of the body of the ambulation aid are created using a configured manufacturing machine and/or process. For example, using a forming process such as thermoforming (e.g., twin sheet thermoforming), blow molding, rotational molding (also referred to as rotomolding), etc.). In twin sheet thermoforming, for example, two sheets of material are first formed and then fused to form an integral body for the ambulation aid. In blow molding or rotational molding, material is provided into a mold and then formed into an integral body for the ambulation aid, for example.

At block 1130, the process determines whether one or more subassemblies are to be included. If so, then, at block 1135, one or more accessory part(s) are attached to the body. For example, one or more handles, feet, hand straps, clip-on frames, and/or the like can be attached to the integral body. Attachments can be formed and/or provided as previously-formed components to the process, for example.

At block 1140, customization of the ambulation aid is identified. For example, a manufacturer, retailer, and/or end user may specify additive(s)/treatment(s) such as one or more layers, colors, paints, laminates, metal flakes, graphics, pad printing, screen printing, laser etching, other surface treatment, etc., to be included in the ambulation aid. If so, then, at block 1145, the aid is customized for the user. For example, one or more such additive(s)/treatment(s) can be added to and/or otherwise integrated into the ambulation aid. In certain examples, one or more of such customizations can be provided as part of the creating of the integral body. Alternatively or in addition, one or more of such customizations can be provided as a separate automated and/or manual process after forming of the integral body.

At block 1150, the aid is made available for use. For example, the ambulation aid is made available for use, trial, sale, and so on. At block 1160, further user customization can be performed. For example, one or more add-ons, accessories, etc., such as a graphic, grip, foot, etc., can be selected and added/modified with respect to the ambulation aid. For example, further user customization can be performed after user purchase of the ambulation aid from a retailer, such as a store, and/or by a retailer/wholesaler prior to a sale to an end user.

Figure 12:
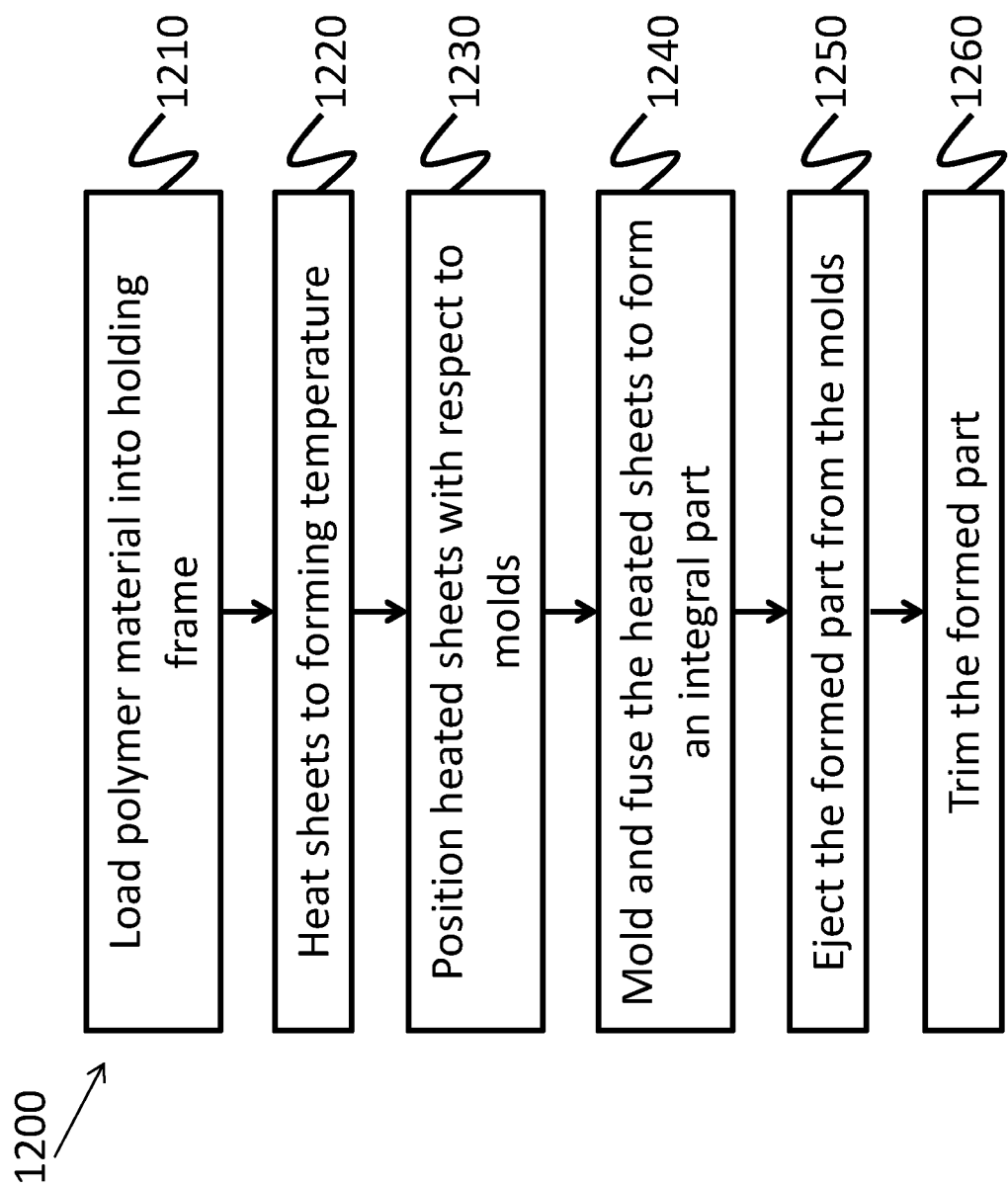
FIG. 12 illustrates a flow diagram of an example thermoforming process to manufacture an ambulation aid.

FIG. 12 illustrates a flow diagram of an example thermoforming process 1200 to manufacture an ambulation aid. Thermoforming is a manufacturing process in which a plastic sheet is heated to a pliable forming temperature, formed to a specific shape in a mold, and trimmed to create a usable product. The sheet, or "film", is heated to a high-enough temperature that it can be stretched into or onto a mold and cooled to a finished shape. In heavy gauge thermoforming, discrete sheets of material are typically fed into a machine for forming. In thin gauge thermoforming, a roll of material is typically provided.

Twin-sheet thermoforming can be performed using single station or multiple station thermoforming. There are two primary types of single station thermoforming, simultaneous forming and sequential forming. In simultaneous single station thermoforming, two polymer (or other material) sheets are formed simultaneously. In sequential single station thermoforming, the two sheets are formed sequentially. In multiple station thermoforming, the sheets are heated as well as formed sequentially before being forced together. Either of these processes can be used, but multiple station thermoforming provides advantages such as being able to utilize different thicknesses of the two sheets of materials, different types of materials, and better overall control of the process as each sheet is processed independently prior to fusing them together, for example. Using a single-station process, however, involves less expensive equipment and a simpler process of operation.

Both single and multiple station twin-sheet thermoforming include the same basic elements, as shown in the example of FIG. 12. At block 1210, two sheets of material (e.g., plastic or other polymer, etc.) are loaded into their respective holding frames. In single station thermoforming, the two sheets of material are loaded simultaneously into their respective holding frames. The holding frame(s) can include a one dual-sheet frame that holds both sheets for simultaneous type single station forming, or two individual frames for sequential type single station forming, for example. In multiple station thermoforming, the sheets are loaded sequentially into their respective holding frames.

At block 1220, sheets are heated to their forming temperature. In single station thermoforming, the two sheets of material are heated to forming temperature simultaneously in their respective holding frames. In multiple station thermoforming, the sheets are heated to forming temperature sequentially in their respective holding frame(s).

At block 1230, sheets are positioned with respect to their corresponding mold. For example, a first sheet is brought over a mold and a second sheet is brought under a mold. If the process is a single station simultaneous type process, the first and second sheets are positioned with respect to first and second molds simultaneously (including, as used herein, substantially simultaneous given some system and/or process delay). If the process is a single station sequential type process, the first and second sheets are positioned with respect to first and second molds sequentially. If the process is a multiple station process, the sheets are positioned with respect to first and second molds sequentially.

At block 1240, the heated sheets are formed to their respective molds and then forced together to fuse into an integral part. For example, in single station simultaneous thermoforming, vacuum is applied to both molds simultaneously to form the parts and then the two molds close together. In some examples, pressure may also be applied to the sealed chamber inside the part to help form the sheets.

In sequential type single station thermoforming process, a first heated sheet is formed to a bottom mold with vacuum and/or pressure. The first sheet is released from a thermoforming machine frame, and the bottom mold drops out of the way. Then, a second heated sheet shuttles or rotates under its respective mold. Vacuum and/or pressure is then applied to form the second sheet to the top mold. Subsequently, the frame holding the second sheet drops out of the way, and the two molds are forced together fusing the two sheets into one integral part.

In a multiple station process, each sheet is heated and formed sequentially. Subsequently, the two molds holding the two formed sheets are forced together, while the sheet material is still hot, to fuse the two parts together into an integral part. For example, a first sheet is loaded into a holding frame. Then, that first sheet is moved into a heating station. After the first sheet has moved into the heating station, a second sheet is loaded into a second holding frame. After the first sheet has heated sufficiently to forming temperature, the first sheet progresses to a forming station over or under its respective mold. At this point the second sheet now progresses to the heating station. The first sheet is formed to its respective mold via vacuum and/or pressure. At this point the second sheet progresses from the heating station over/under its respective mold. Then, the second sheet is formed to its respective mold via vacuum and/or pressure. At this stage, the two molds are forced together to fuse the two formed sheets into an integral part. The integral part is ejected from the molds and ready for potential trimming operations.

As discussed above, areas where the two sheets are forced into contact with each other are commonly referred to as "kiss-offs" and can provide much increased durability and structural integrity to the formed integral part. In kiss-off areas, one can typically observe witness marks in the plastic and/or other polymer sheet where the respective molds have applied pressure to fuse the heated material together. Hiding or disguising these witness marks within the design of the monocoque ambulation aid part can assist in alleviating their detraction from the overall finished appearance of the part. Areas where the molds come together entirely and force all of the heated material out of a given area ("pinch-offs") can result in the trimming of the formed integral part Areas where the two sheets just meet up but do not actually fuse together are commonly referred to as "near kiss-offs." Near kiss-offs can also provide increased durability and structural integrity, but without leaving the witness mark observed with kiss-offs. Near kiss-offs can be implemented in forming an example ambulation aid in place of or in conjunction with the kiss-off features described above, for example.

At block 1250, the formed integral part is ejected from the molds and ready for trimming. At block 1260, the formed part can be trimmed. Trimming can be executed by hand manual knife operation, hand router, Computer Numerically Controlled (CNC) router, manual or automated die cutting, etc.

Figure 13:
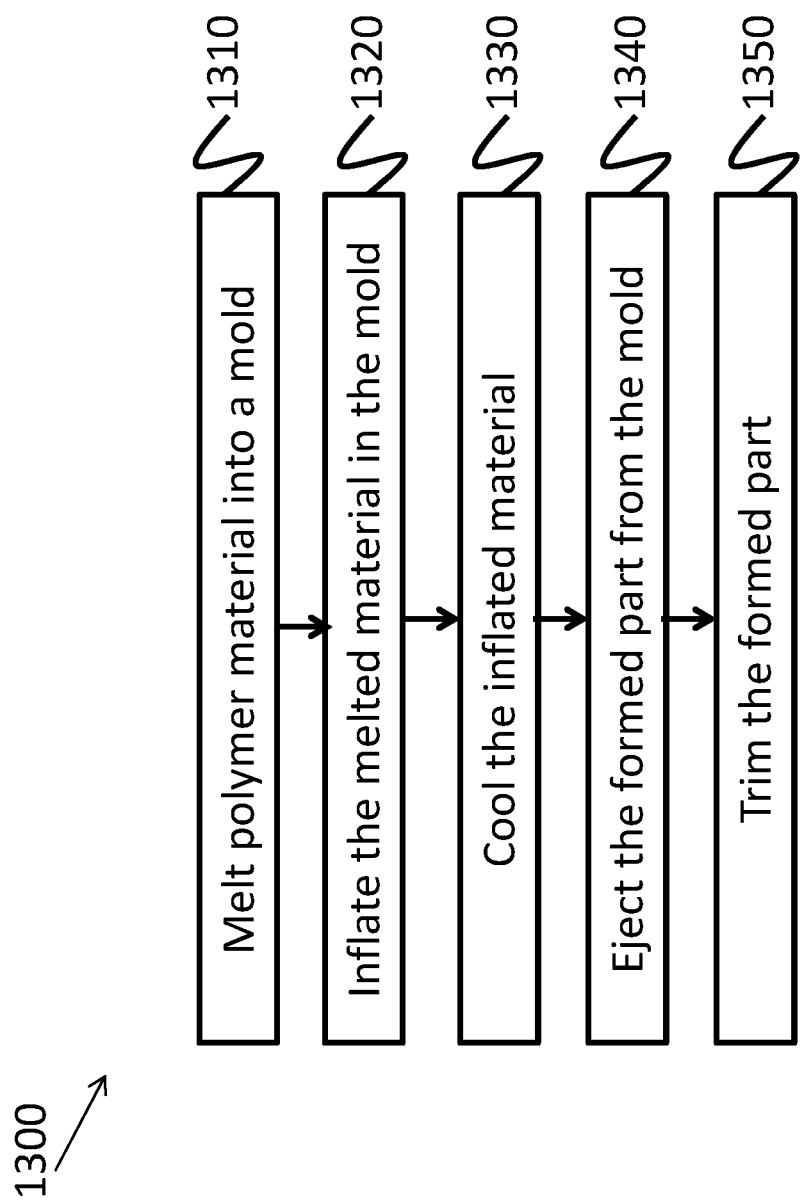
FIG. 13 illustrates a flow diagram of an example blow molding process to manufacture an ambulation aid.

FIG. 13 illustrates a flow diagram of an example blow molding process 1300 to manufacture an ambulation aid. Blow molding is a manufacturing process by which hollow plastic parts are formed.

At block 1310, polymer material is heated to melt the polymer material into a mold. In certain examples, the blow molding process begins with melting down plastic and forming the plastic into a parison or preform. The parison is a tube-like piece of plastic with a hole in one end through which compressed air can pass. The parison can be of a single material type, or the parison can be multiple layers to create a desired outside aesthetic, for example, or other varying property(-ies). The parison is then heated.

At block 1320, the heated material is inflated in the mold. For example, the heated parison is clamped into a mold, and air is pumped into the parison. The air pressure pushes out (e.g., inflates) the material (e.g., plastic or other polymer) to match the mold. At block 1330, the inflated material is cooled.

At block 1340, once the material has cooled and hardened the mold opens up and the formed part is ejected. At block 1350, the formed part may be trimmed, if necessary or desired.

In general, there are three main types of blow molding: extrusion blow molding, injection blow molding, and stretch blow molding. In extrusion blow molding (EBM), plastic is melted and extruded into a hollow tube (a parison). The parison is captured by closing the parison into a cooled metal mold. Air is then blown into the parison, inflating it into the shape of the hollow container or part. After the plastic has cooled sufficiently, the mold is opened and the part is ejected.

Extrusion blow molding can be continuous or intermittent. In continuous extrusion blow molding, the parison is extruded continuously, and individual parts are cut off with a suitable knife. In intermittent extrusion blow molding there are two processes: straight intermittent and accumulator. The straight intermittent method is similar to injection molding in which a screw turns, stops, and pushes the melt out. With the accumulator method, an accumulator gathers melted plastic, and, when the previous mold has cooled and enough plastic has accumulated, a rod pushes the melted plastic and forms the parison. In this case the screw may turn continuously or intermittently.

In injection blow molding (IBM) can be used for the production of hollow objects. In an IBM process, a polymer is injection molded onto a core pin; then the core pin is rotated to a blow molding station to be inflated and cooled. The IBM process is divided into three elements: injection, blowing and ejection.

An injection blow molding machine is based on an extruder barrel and screw assembly which melts the polymer. The molten polymer is fed into a hot runner manifold where it is injected through nozzles into a hollow, heated preform mold. The preform mold forms the external shape and is clamped around a mandrel (the core rod) which forms the internal shape of the preform. The preform includes a fully formed bottle/jar neck with a thick tube of polymer attached, which will form the body.

The preform mold opens and the core rod is rotated and clamped into the hollow, chilled blow mold. The core rod opens and allows compressed air into the preform, which inflates it to the finished article shape.

After a cooling period the blow mold opens and the core rod is rotated to the ejection position. The finished article is stripped off the core rod and leak-tested prior to packing. The preform and blow mold can have many cavities, typically three to sixteen depending on the article size and the required output. There are three sets of core rods, which allow concurrent preform injection, blow molding and ejection, for example.

In a stretch blow molding (SBM) process, the polymer is first molded into a "preform" using the injection molding process. The preforms are packaged, and fed (after cooling) into a reheat stretch blow molding machine. In the SBM process, the preforms are heated (e.g., using infrared heaters) above a transition temperature, and then blown using high pressure air into an integral part (e.g., an integral ambulation aid body part) using metal blow molds. The stretching of some polymers, such as PET (polyethylene terephthalate) results in strain hardening of the resin, allowing the formed parts to resist deforming under the pressure.

Figure 14:
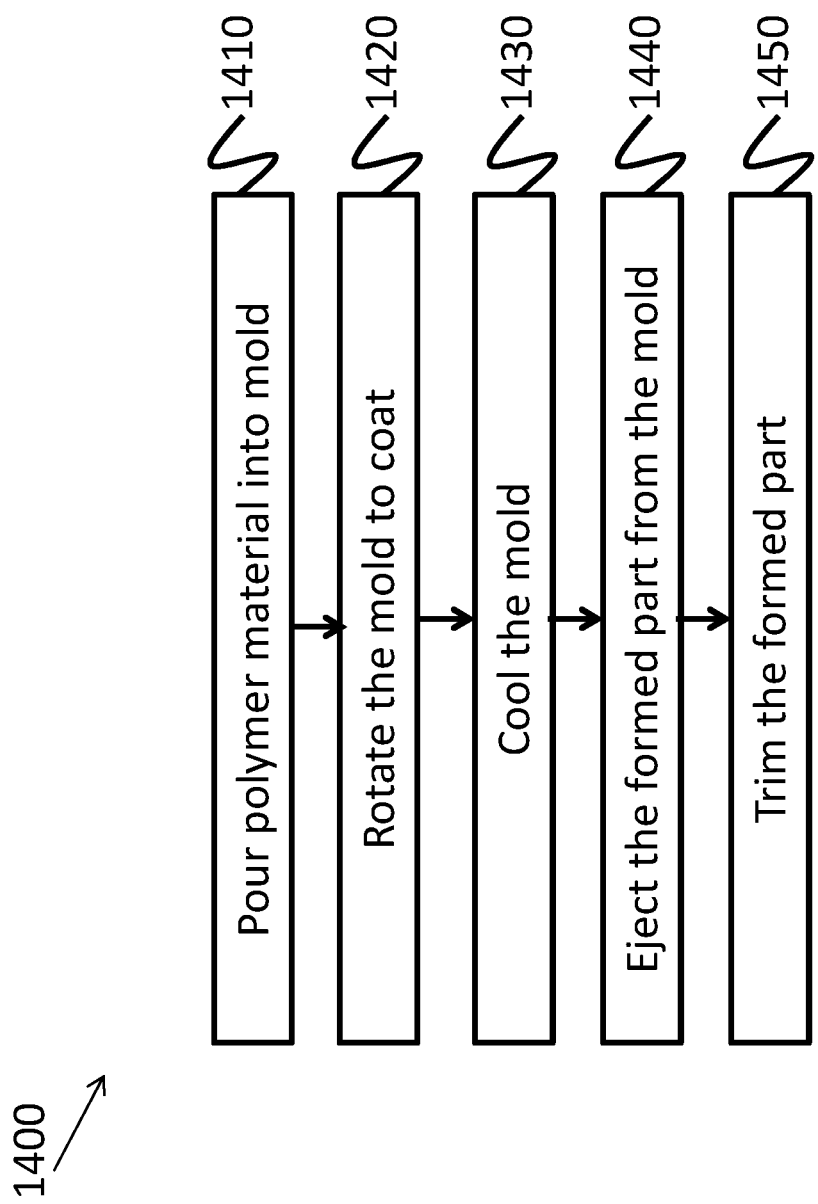
FIG. 14 illustrates a flow diagram of an example rotational molding process to manufacture an ambulation aid.

FIG. 14 illustrates a flow diagram of an example rotational molding process 1400 to manufacture an ambulation aid. Rotational molding (also referred to as rotomolding) involves a hollow mold which, at block 1410, is filled with a charge or shot weight of material. At block 1420, the mold is then slowly rotated (e.g., around two perpendicular axes) causing the softened material to disperse and stick to the walls of the mold. For example, the mold is rotated to tumble/spin the material around to evenly coat the mold.

At block 1430, the mold is cooled. For example, the polymer is to be cooled so that it solidifies and can be handled safely. The part shrinks on cooling, coming away from the mold and facilitating easy removal of the part. The cooling rate must be kept within a certain range. Rapid cooling (for example, water spray) may result in cooling and shrinking at an uncontrolled rate, producing a warped part. In order to maintain even thickness throughout the part, the mold continues to rotate at all times during a heating phase and, to avoid sagging or deformation, also rotates during a cooling phase. At block 1440, the part is removed from the mold. At block 1450, the formed part may be trimmed if needed or desired.

In certain examples, a gas assist molding process can be used to manufacture an example ambulation aid and/or component thereof. An example gas assist molding process includes injecting a fixed, short volume of polymer melt into a vented mold cavity (e.g., a "short shot"). Gas channels act as internal runners along the part to fill from a single gate into the mold, thereby eliminating weld lines in the resulting part associated with multiple gates. After polymer injection (or after a short delay), compressed gas (e.g., nitrogen and/or other relatively inert gas) is injected into the mold cavity through a central core of the melt. The gas pressure acts on the fluid melt core, completing the mold filling process. The gas takes a path of least resistance, penetrating and hollowing (e.g., coring out) a network of predesigned thick flow leader sections (e.g., gas channels), displacing molten polymer at the core, and filling out the mold cavity (e.g., primary gas penetration). Packing is not accomplished by an injection ram/cushion, but rather by the gas pressure itself. After mold filling, the gas pressure is maintained in order to pack the part and compensate for volumetric shrinkage (e.g., secondary gas penetration). After the part has cooled to a point at which the part is rigid enough to eject, the gas is vented off through a pin or by sprue breakaway (and sometimes recycled) prior to mold opening and part ejection, for example.

In operation, an elderly, ill, injured, or impaired individual uses an ambulation aid to assist that user in moving around, standing, supporting themselves, rehabilitation, etc. The user grasps the handle(s) of the device to help him or her walk forward, turn, stabilize, stand, etc. Based on the design, weighting, and arrangement of the ambulation aid, the aid may be self-supporting and can remain standing upright when not in use.

Modifications and variations as would be apparent to a skilled addressee are determined to be within the scope of the present invention.

It is to be understood that, if any prior art is referred to herein, such reference does not constitute an admission that the prior art forms a part of the common general knowledge of the art in any country.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. It will be understood that the invention disclosed and defined in this specification extends to all alternative combinations of two or more of the individual features mentioned or evident from the text or drawings. All of these different combinations constitute various alternative aspects of the invention.

The invention claimed is:

1. A single-point supportive ambulation aid comprising:
means for supporting formed from moldable foam material in a single body portion to support a user;
means for grasping integrated proximate to a first end with and protruding from the means for supporting and providing an area to be gripped by a user outside the means for supporting, the means for grasping formed as an adjustable handle protruding from means for receiving formed in the means for supporting and having a position adjustable along a T-slotted track within the means for receiving; and
means for contacting a walking surface integrated with the means for supporting and adapted to provide a single point of contact with the walking surface to facilitate user movement and support in conjunction with the means for supporting and means for grasping.

2. The ambulation aid of claim 1, wherein the aid is formed as a cane-type ambulation aid having a single graspable area.

3. The ambulation aid of claim 1, wherein the aid is formed as a crutch-type ambulation aid having a plurality of graspable areas.

4. The ambulation aid of claim 1, wherein the means for grasping is formed to include a movable component to adjust a height of the body portion with respect to the user.

5. The ambulation aid of claim 1, wherein the means for supporting is formed in monocoque construction.

6. The ambulation aid of claim 5, wherein the means for supporting further includes a skin forming a surface of the single body portion and providing a supporting structure to provide support for the user via the single body portion.

7. The ambulation aid of claim 1, wherein the means for contacting a walking surface is formed as a movable component to adjust a height of the body portion with respect to the walking surface.

8. The ambulation aid of claim 1, wherein the means for supporting is formed using injection molding.

9. A method of forming a single-point supportive ambulation aid as an integral part, the method comprising:

forming, from a supply of moldable foam material, the ambulation aid as an integral part, the integral part including a single body portion formed from the moldable foam material to support a user, wherein the single body portion is formed to attach to: a) a graspable area including a sliding geometry integrated proximate to a first end with a side of the body portion and protruding from the body portion and providing an area to be gripped by a user outside the body portion, the graspable area protruding from a receptacle formed in the body portion and having a position adjustable within the receptacle via the sliding geometry, the receptacle located in an upper area of the body portion and including a T-slot track to facilitate movement of the graspable area within the receptacle via the sliding geometry; and b) a foot portion integrated with the body portion for providing a single point of contact with a walking surface to facilitate user movement and support in conjunction with the body portion and graspable area through the integral part, the foot portion located in a bottom area of the body portion, wherein the foot portion is adapted to contact the walking surface in a direction of force substantially perpendicular to the walking surface and wherein the graspable area protrudes from the body portion substantially perpendicular to the foot portion; and attaching the graspable area and foot portion to the body portion.

10. The method of claim 9, wherein forming includes injection molding to form the single body portion.

11. The method of claim 9, wherein the aid is formed as a cane-type ambulation aid having a single graspable area.

12. The method of claim 9, wherein the aid is formed as a crutch-type ambulation aid having a plurality of graspable areas.

13. The method of claim 12, wherein at least one of the plurality of graspable areas is formed as an adjustable handle positioned in a T-slot track.

14. The method of claim 9, wherein the graspable area is formed to include a movable component to adjust a height of the body portion with respect to the user.

15. The method of claim 9, wherein the graspable area is formed as a handle.

16. The method of claim 9, wherein the integral part is formed in monocoque construction.

17. The method of claim 16, wherein a skin forming a surface of the integral part provides a supporting structure to provide support for the user via the integral part.

18. The method of claim 9, wherein the foot portion is formed as a movable component to adjust a height of the body portion with respect to the walking surface.

* * * * *